United States Patent
Aronov et al.

(10) Patent No.: US 10,986,827 B2
(45) Date of Patent: Apr. 27, 2021

(54) METHODS FOR DEPLOYING BIOSENTINELS TO AGRICULTURAL FIELDS AND MONITORING BIOTIC AND ABIOTIC STRESSES IN CROPS REMOTELY

(71) Applicant: InnerPlant, Inc., San Francisco, CA (US)

(72) Inventors: Shely Aronov, San Francisco, CA (US); Roderick Kumimoto, San Francisco, CA (US); Ari Kornfeld, San Francisco, CA (US)

(73) Assignee: InnerPlant, Inc., San Francisco, CA (US)

( * ) Notice: Subject to any disclaimer, the term of this patent is extended or adjusted under 35 U.S.C. 154(b) by 0 days.

(21) Appl. No.: 16/908,526

(22) Filed: Jun. 22, 2020

(65) Prior Publication Data

US 2020/0396976 A1    Dec. 24, 2020

Related U.S. Application Data

(60) Provisional application No. 62/864,401, filed on Jun. 20, 2019.

(51) Int. Cl.
| | | |
|---|---|---|
| *A01M 1/02* | (2006.01) | |
| *G06K 9/00* | (2006.01) | |
| *A01N 63/14* | (2020.01) | |
| *G06Q 50/02* | (2012.01) | |
| *A01G 13/10* | (2006.01) | |

(52) U.S. Cl.
CPC .............. *A01M 1/026* (2013.01); *A01G 13/10* (2013.01); *A01N 63/14* (2020.01); *G06K 9/00657* (2013.01); *G06Q 50/02* (2013.01); *G06T 2207/30188* (2013.01)

(58) Field of Classification Search
CPC ....... A01M 1/026; A01N 63/14; A01G 13/10; G06K 9/00657; G06Q 50/02; G06T 2207/30188
See application file for complete search history.

(56) References Cited

U.S. PATENT DOCUMENTS

| 2006/0183137 A1* | 8/2006 | Harper | ............... C12N 15/8273 435/6.14 |
|---|---|---|---|
| 2009/0044287 A1* | 2/2009 | Bughrara | ........... C12N 15/8273 800/260 |

(Continued)

*Primary Examiner* — Michael R Neff
(74) *Attorney, Agent, or Firm* — Run8 Patent Group, LLC; Peter Miller; Leah Raddatz

(57) ABSTRACT

One variation of a method for interpreting pressures in plants includes: accessing a first image of a first set of sentinel plants in a field; accessing a second image of a second set of sentinel plants in the field, recorded during a first period; interpreting a first pressure of a stressor in the first set based on features extracted from the first image, captured during the first period; interpreting a second pressure in the second set based on features extracted from the second image; deriving a model associating pressure at the first set and pressure at the second set based on the first pressure and the second pressure; interpreting a third pressure in the first set based on features extracted from a third image captured during a second period; and predicting a fourth pressure in the second set during the second period based on the third pressure and the model.

20 Claims, 7 Drawing Sheets

(56) References Cited

U.S. PATENT DOCUMENTS

| | | |
|---|---|---|
| 2009/0265815 A1* | 10/2009 | Alexandrov ......... C07K 14/415 |
| | | 800/298 |
| 2015/0027040 A1 | 1/2015 | Redden |
| 2016/0069743 A1 | 3/2016 | McQuilkin et al. |
| 2017/0131254 A1 | 5/2017 | Shriver et al. |
| 2018/0259496 A1 | 9/2018 | McPeek |
| 2019/0108413 A1 | 4/2019 | Chen et al. |

* cited by examiner

METHODS FOR DEPLOYING BIOSENTINELS TO AGRICULTURAL FIELDS AND MONITORING BIOTIC AND ABIOTIC STRESSES IN CROPS REMOTELY

CROSS-REFERENCE TO RELATED APPLICATIONS

This application claims the benefit of U.S. Provisional Application No. 62/864,401, filed on 20 Jun. 2019, which is incorporated in its entirety by this reference.

TECHNICAL FIELD

This invention relates generally to the field of agriculture and more specifically to a new and useful methods for deploying biosensors to agricultural fields and monitoring plant stressors in crops based on biosensors in the field of agriculture.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
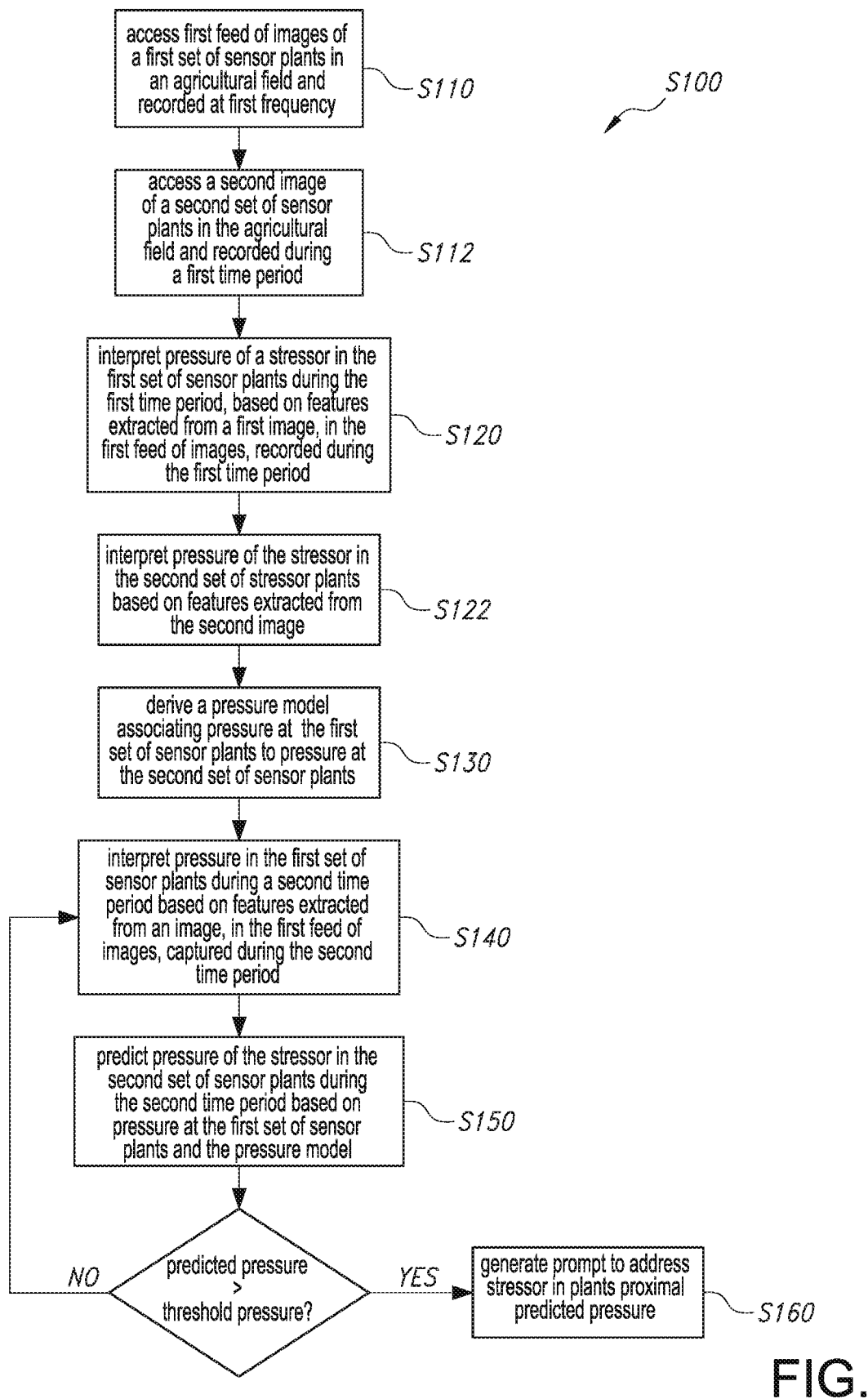
FIG. 1 is a flowchart representation of a method.
Figure 2:
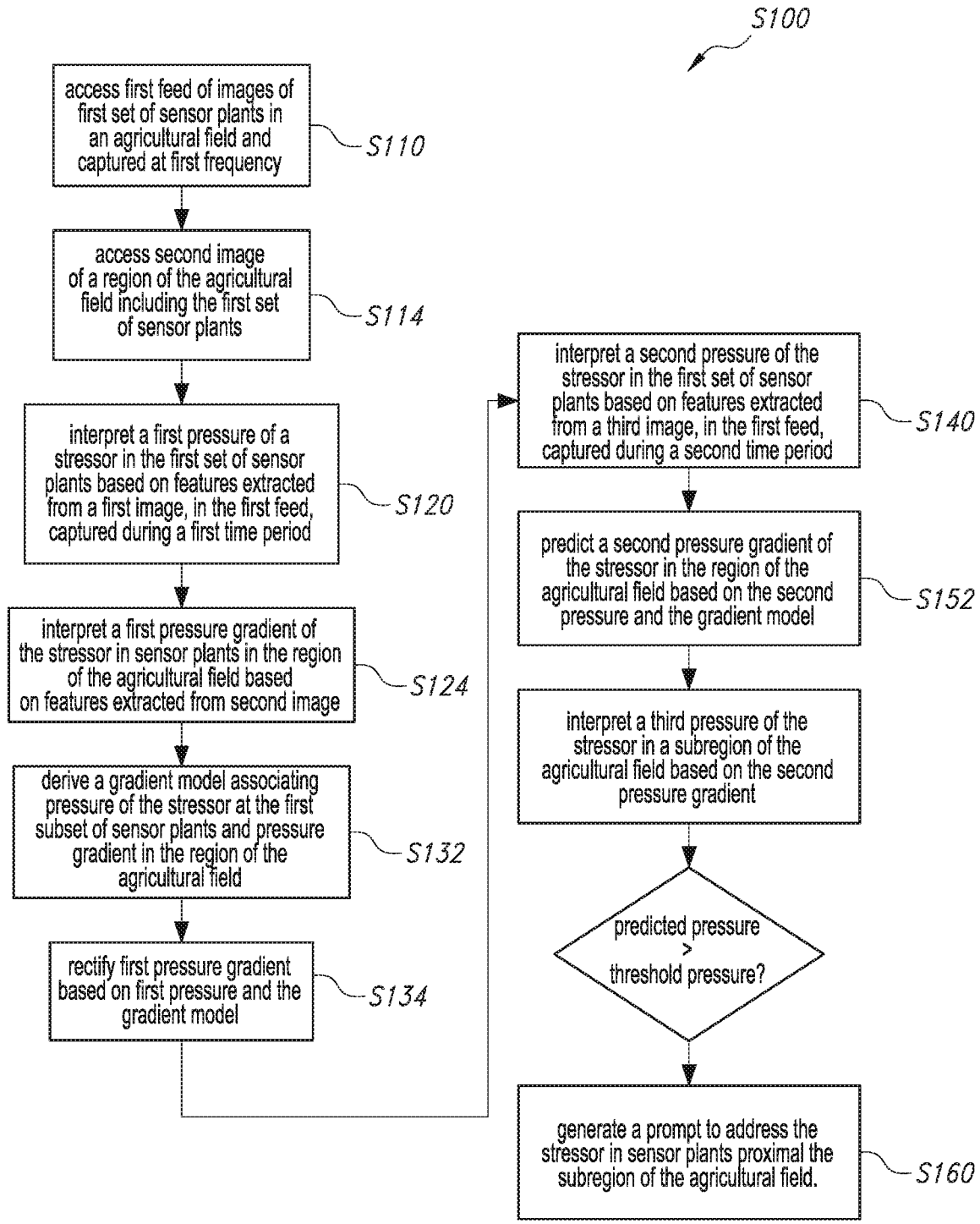
FIG. 2 is a flowchart representation of the method.
Figure 3:
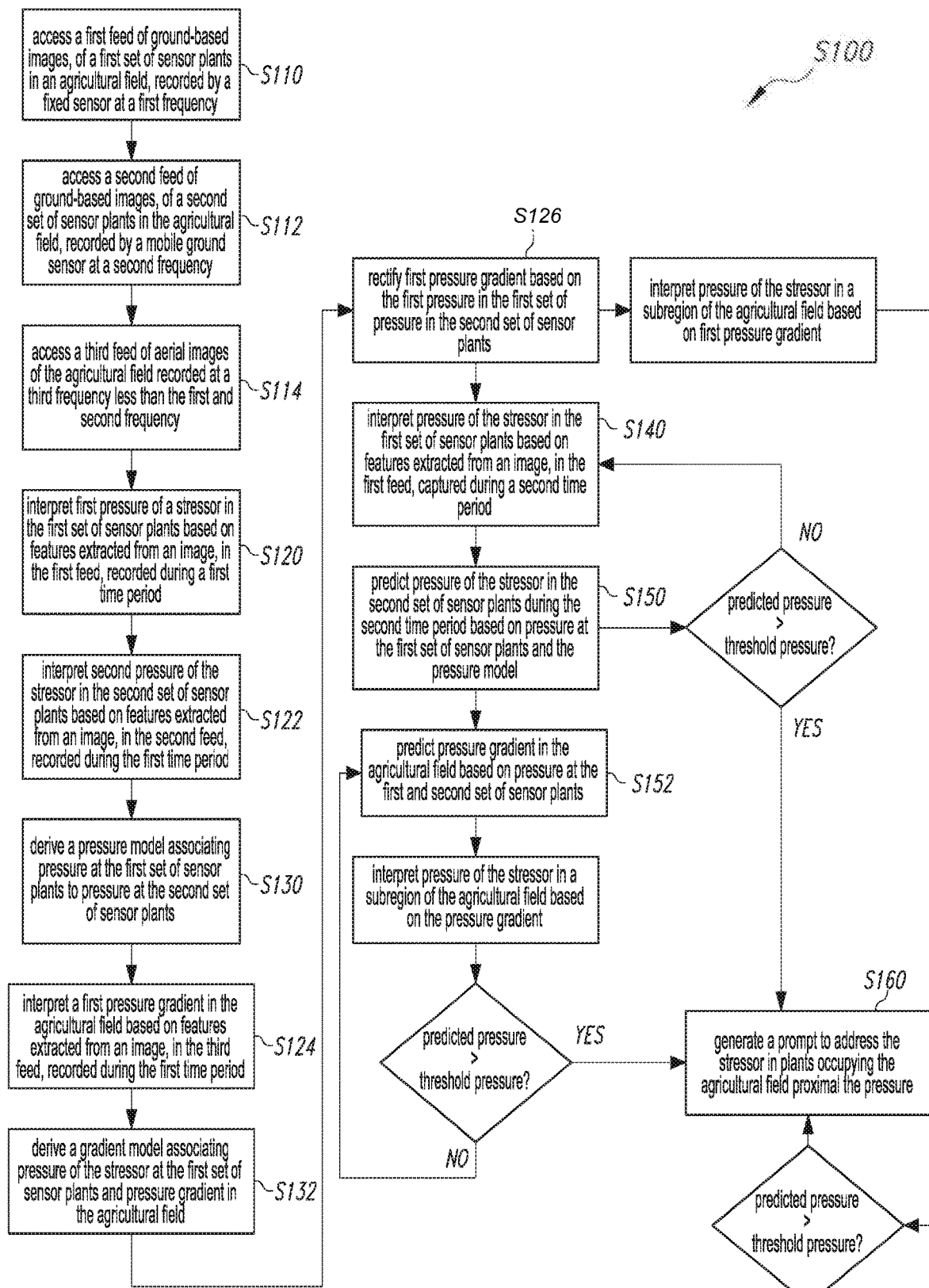
FIG. 3 is a flowchart representation of the method.

As shown in FIGS. 1-3, a method S100 includes: accessing a first feed of images recorded at a first frequency by a fixed sensor facing a first set of sentinel plants in an agricultural field in Block S110; accessing a second image of a second set of sentinel plants in the agricultural field, the second image recorded by a mobile sensor during a first time period in Block S112; interpreting a first pressure of a stressor in the first set of sentinel plants during the first time period based on a first set of features extracted from a first image, in the first feed of images, captured during the first time period in Block S120; interpreting a second pressure of the stressor in the second set of sentinel plants during the first time period based on a second set of features extracted from the second image in Block S122; deriving a pressure model associating pressure of the stressor at the first set of sentinel plants and pressure of the stressor at the second set of sentinel plants based on the first pressure and the second pressure in Block S130; interpreting a third pressure of the stressor in the first set of sentinel plants during a second time period based on a third set of features extracted from a third image, in the first feed of images, captured during the second time period in Block S140; predicting a fourth pressure of the stressor in the second set of sentinel plants during the second time period based on the third pressure and the pressure model in Block S150; and, in response to the fourth pressure in the second set of sentinel plants exceeding a threshold pressure, generating a prompt to address the stressor in plants proximal the second set of sentinel plants in the agricultural field in Block S160.

As shown in FIGS. 2 and 3, one variation of the method S100 includes: accessing a first feed of images recorded at a first frequency by a fixed sensor facing a first set of sentinel plants in an agricultural field in Block S110; accessing a second image of a region of the agricultural field comprising the first set of sentinel plants, the second image recorded by a mobile sensor during a first time period in Block S114; interpreting a first pressure of a stressor in the first set of sentinel plants during the first time period based on a first set of features extracted from a first image, in the first feed of images, captured during the first time period in Block S120; interpreting a first pressure gradient of the stressor in sentinel plants in the region of the agricultural field during the first time period based on a second set of features extracted from the second image in Block S124; deriving a gradient model associating pressure of the stressor at the first set of sentinel plants and pressure gradient of the stressor in the region of the agricultural field based on the first pressure of the stressor and the first pressure gradient in Block S132; interpreting a second pressure of the stressor in the first set of sentinel plants during a second time period based on a third set of features extracted from a third image, in the first feed of images, captured during the second time period in Block S140; predicting a second pressure gradient of the stressor in the region of the agricultural field during the second time period based on the second pressure of the stressor and the model in Block S152; and in response to the second pressure gradient predicting a third pressure in a subregion of the agricultural field and exceeding a threshold pressure, generating a prompt to address the stressor in plants occupying the agricultural field proximal the subregion of the agricultural field in Block S160.

As shown in FIGS. 2 and 3, one variation of the method S100 includes: accessing a first feed of images of a first set of sentinel plants in an agricultural field, the first feed recorded at a first frequency by a fixed sensor in Block S110; accessing a second image of the agricultural field recorded by an aerial sensor during a first time period in Block S114; interpreting a first pressure of a first stressor, in a set of stressors, in the first set of sentinel plants during the first time period based on a first set of features extracted from a first image, in the first feed of images, captured during the first time period in Block S120; interpreting a second pressure of the first stressor in the first set of sentinel plants during the first time period based on a second set of features extracted from a region of the second image comprising the first set of sentinel plants in Block S122; interpreting a first pressure gradient of the first stressor in the agricultural field during the first time period based on a third set of features extracted from regions of the second image in Block S124; deriving a model associating pressure of the first stressor at the first set of sentinel plants with pressure gradient of the first stressor in the agricultural field based on the second pressure and the first pressure gradient in Block S132; and rectifying the first pressure gradient of the first stressor in the agricultural field during the first time period based on the first pressure and the model in Block S134.

As shown in FIG. 3, one variation of the method S100 includes: accessing a first feed of ground-based images recorded by a fixed sensor at a first frequency in Block S110, the fixed sensor facing a first set of sentinel plants in an agricultural field; accessing a second feed of ground-based images in Block S112, of a second set of sentinel plants in the agricultural field, recorded by a mobile ground sensor at a second frequency; accessing a third feed of aerial images in Block S114, of the agricultural field, recorded at a third frequency less than the first frequency and the second frequency; estimating a first pressure of a stressor in the first set of sentinel plants at a first time based on a first set of features extracted from the first feed in Block S120; estimating a second pressure of the stressor in the second set of sentinel plants at a second time based on a second set of features extracted from the second feed in Block S122; interpolating pressures in plants between the first set and the second set at the second time based on the first pressure and the second pressure; calculating a first pressure gradient in the agricultural field at the first time based on a third set of features extracted from regions of the third feed depicting the first set, the second set, and a third set of sentinel plants in the agricultural field in Block S124; and rectifying the first pressure gradient in the agricultural field at the first time based on the first stressor in the first set and the second stressor in the second set in Block S126. The method can further include serving a prompt to an operator affiliated with the agricultural field to address pressures of the stressor in the agricultural field based on the first pressure, the second pressure, and the first pressure gradient in Block S160.

2. Applications

Generally, a computer system (e.g., a local computing device, a remote server, a computer network) executes Blocks of the method S100: to identify a stressor present at a sentinel plant based on signals (e.g., fluorescence in the electromagnetic spectrum) generated by the sentinel plant, which is genetically-modified to signal environmental conditions adverse to plant health or growth; to interpret presence and/or magnitude of the stressor at other plants nearby based on signals generated by the sentinel plant; and to selectively generate and distribute prompts for mitigating the stressor at the sentinel plant and/or at the nearby plants.

More specifically, a sentinel plant can be genetically-modified to include a set of promoter-reporter pairs configured to trigger signal generation within the sentinel plant in the presence of a particular biotic and/or abiotic stressor to which the sentinel plant is exposed, such as: a pest; a viral disease; excess or insufficient water; excess heat or cold; and/or nutrient deficiency. An optical device can record optical signals generated by the sentinel plant (e.g., in the form of color or multispectral images); and the computer system can extract features (e.g., intensities at particular wavelengths) from these images, interpret presence and/or magnitude of a particular stressor exposed to the sentinel plant based on these features, and interpolate or extrapolate health and environmental conditions at other plants nearby (e.g., non-sentinel plants; other unimaged sentinel plants) based on presence and/or magnitude of the stressor thus indicated by the sentinel plant.

For example, the computer system can extract intensities of particular wavelengths corresponding to specific compounds (e.g., proteins) in the sentinel plant and interpret a pressure of a particular stressor exposed to the sentinel plant based on intensities of these wavelengths—such as based on a stored model linking plant stressors to wavelengths of interest based on known characteristics of promoter and reporter genes in the sentinel plant—and before such stressors are visually discernible in the visible spectrum (i.e., with an unaided human eye). The computer system can also interpolate or extrapolate presence or magnitude of these stressors in other plants near this sentinel plant to predict overall health of a crop or agricultural field.

2.1 Applications: Sentinel Plant Cluster and Fixed Sensor

In one example, the sentinel plant can be genetically engineered to include a promoter indicative of a fungal stressor found in corn crops. The promoter can be paired to a red fluorescing reporter, such that the sentinel plant exhibits red fluorescence when exposed to this fungal pressure in excess of a threshold magnitude and/or for more than a threshold period of time. Sentinel plants exhibiting this characteristic may be planted in clusters throughout an agricultural field planted with a commercial non-sentinel corn crop, such as near a center of the agricultural field. An optical sensor (e.g., a multi-spectral camera) mounted on a pole within the center cluster of sentinel plants can collect images of the adjacent sentinel plants, such as hourly or daily, and offload these images (e.g., via a computer network) to the computer system. The computer system can then extract magnitudes (e.g., intensities) of wavelengths of the red fluorescing reporter from these images and implement a stored model to interpret pressure (e.g., presence and/or magnitude) of the fungal stressor in this center cluster of sentinel plants over time based on magnitudes of these wavelengths.

Based on the interpreted pressure of the fungal stressor, the computer system can recommend a particular action or set of actions to mitigate this pressure of the fungal stressor. More specifically, the computer system can: isolate a subset of actions, in a set of actions, linked to mitigating fungal stressors; and isolate a first action, in the subset of actions, linked to the pressure of the fungal stressor. For example, the computer system can recommend a first action for mitigating fungal pressures above a threshold fungal pressure and a second action for mitigating fungal pressure below the threshold fungal pressure. Further, the computer system can recommend mitigation or treatment techniques for application to plants proximal to the center cluster of sentinel plants, such as within a particular distance of the center of the crop based on the pressure of the fungal stressor. For example, the computer system can recommend: treating plants (e.g., sentinel plants and non-sentinel plants) within a first radius from the center cluster with a first quantity of fungicide at a first frequency; treating plants outside the first radius and within a second radius from the center cluster with a second quantity of fungicide less than the first quantity at the first frequency; and treating plants outside the second radius and within a third radius from the second cluster with the second quantity of fungicide at a second frequency less than the first frequency. In another example, the computer system can recommend treatment of surrounding plants based on predicted movement of the fungal pressure across the crop (e.g., based on a previous pressure of the fungal stressor). In yet another example, the computer system can recommend collecting samples from soil and plants proximal the fungal pressure in the cluster of sentinel plants to collect more precise diagnostics with respect to type and spread of the fungal pressure throughout the crop and determine appropriate treatment.

2.2 Applications: Sentinel Plant Clusters and Ground-based Mobile Sensor

In the foregoing example, sentinel plants may be planted in other clusters throughout the agricultural field, such as near each corner of the agricultural field. A mobile optical sensor mounted on a truck, tractor, or other farm implement may intermittently capture images of these clusters of sentinel plants when driven on an access road along this agricultural field, such as multiple times in one day per week. The computer system can: access these images; implement methods and techniques described above to extract magnitudes of wavelengths of the red fluorescing reporter from these images; implement the stored pressure model to interpret pressures (e.g., presence and/or magnitude) of the fungal stressor in these clusters of sentinel plants based on magnitudes of these wavelengths; pair these stressor diagnoses for these corner clusters with temporally-nearest stressor diagnoses for the center cluster; and compile concurrent stressor diagnoses for the corner and center clusters over time to generate a model that predicts fungal presence and magnitude at the corner clusters based on fungal presence and magnitude at the center cluster.

Later, the scan cycle can: implement this model to predict fungal pressures at the corner clusters based on fungal pressure derived from a next image of the center cluster; interpolate fungal pressure throughout the crop between the center and corner clusters; and generate prompts or recommendations for fungal mitigation in all or particular regions of the agricultural field.

In one implementation, the mobile optical sensor may capture images of sentinel plants at different frequencies and at different locations within the crop to achieve greater spatial resolution. The mobile optical sensor may collect these images intermittently and inconsistently (e.g., less temporal resolution). However, the computer system can leverage data extracted from these images recorded by the mobile optical sensor in combination with consistent data extracted from images recorded by the fixed sensor over the singular sentinel plant cluster, to expand fungal pressure predictions across the crop. Further, the computer system can converge on a more precise model for predicting pressures across the crop over time based on data extracted from these images, such as via incorporations of machine learning algorithms.

2.3 Applications: Sentinel Plant Clusters and Aerial Sensor

In the foregoing example, an aerial optical sensor may intermittently capture images of the agricultural field, including each cluster of sentinel plants, such as biweekly or once per month. From an aerial image of the agricultural field, the computer system can interpret a pressure gradient in the agricultural field and/or a pressure at each cluster of sentinel plants in the agricultural field. The computer system can distinguish clusters of sentinel plants from non-sentinel plants in the aerial image, such as by: overlaying a mask over the aerial image configured to obscure regions of the image corresponding to non-sentinel plants in the agricultural field; detecting a baseline signal characteristic of sentinel plants but not linked to fungal pressures in subregions of the image corresponding to sentinel-plants in the agricultural field; and/or matching geotags included in the aerial image to known GPS locations of sentinel plants in the agricultural field. Upon matching subregions of the aerial image corresponding to clusters of sentinel plants, the computer system can derive a pressure of the fungal stressor for each subregion and interpolate between pressures at each subregion to interpret a pressure gradient across the agricultural field. Further, the computer system can interpret a pressure of the fungal stressor at the cluster of sentinel plants from an image recorded by the fixed sensor during a concurrent time period. Then, based on the location of the fixed sensor corresponding to a particular subregion of the agricultural field, the computer system can derive a scalar linking pressure of the fungal stressor at this particular subregion, as recorded by the fixed sensor, to pressure of the fungal stressor at this particular subregion, as recorded by the aerial optical sensor.

The computer system can then rectify (e.g., scale) the pressures at each subregion or cluster of sentinel plants according to the scalar. Based on these updated pressures, the computer system can generate prompts to mitigate fungal pressure in subregions of the crop as needed.

Further, the computer system can derive a gradient model (e.g., scalar) linking pressures of the fungal stressor at the cluster of sentinel plants in the center of the crop, recorded by the fixed sensor, to pressures of the stressor at other clusters of sentinel plants (e.g., gradient of the agricultural field). At a later time, the computer system can: access an image of the cluster of sentinel plants recorded by the fixed sensor; interpret a pressure of the fungal stressor at the cluster of sentinel plants based on features extracted from the image; and predict a pressure of the fungal stressor at each subregion of the agricultural field based on the pressure of the fungal stressor at the cluster of sentinel plants and the gradient model.

3. Terms

As described above, a "sentinel plant" is referred to herein as a plant configured to signal presence of a particular stressor or set of stressors within and/or at the plant. A sentinel plant can be genetically-modified to include a set of promoter-reporter pairs (e.g., one promoter-reporter pair, three promoter-reporter pairs) configured to trigger generation of a detectable signal or signals by the sentinel plant in the presence of a particular stressor or set of stressors. For example, a sentinel plant can be genetically-modified to include a first promoter-reporter pair configured to trigger generation of a red fluorescence signal by the sentinel plant in the presence of fungi. Thus, the sentinel plant can generate a detectable signal that, when detected, may alert a user (e.g., a farmer, an agronomist, a botanist) associated with the sentinel plant of a stressor or stressors present. Further, a sentinel plant of a first plant type can be configured to signal presence of stressors in plants of the first type and/or of a different type. For example, a sentinel corn plant can be configured to signal presence of stressors in corn plants. In another example, a sentinel tomato plant can be configured to signal presence of stressors in potato plants.

In one implementation, a sentinel plant can be monitored for the presence of stressors (e.g., pests, diseases, dehydration) in other (non-sentinel) plants. Generally, a small quantity of sentinel plants can be monitored to extract insights into a larger population of plants (e.g., in crops). For example, a cluster of sentinel plants can be planted along an outside edge of a crop of plants and monitored for the presence of pests to inform a user (e.g., a farmer, an agronomist, a botanist) associated with the crop if and/or when a population of pests has entered the crop along this outside edge. In another example, a sentinel plant of a first plant type (e.g., tomatoes) can be grown in a greenhouse setting (e.g., glass roof or factory farm), located in a particular region, and monitored for the presence of stressors (e.g., dehydration, disease, pest) indicative of plant health. A user associated with the greenhouse setting may extract insights from stressors present at the sentinel plant to inform planting and/or treatment of other plants (e.g., in a crop) of the same plant type when grown in the particular region.

As described above, a "stressor" is referred to herein as a type of abiotic and/or biotic stress that may negatively affect plant health, such as pest, disease, water, heat, and/or nutrient stresses or deficiencies. For example, a plant may experience an insect stressor corresponding to presence of an insect or insect population at the plant that may hinder plant growth and/or health.

As described above, a "pressure" is referred to herein as a measurable and/or detectable presence of a particular stressor and/or set of stressors in plants (e.g., in a cluster of sentinel plants, in a crop of plants). For example, the computer system can detect an insect stressor at a cluster of sentinel plants and—based on features extracted from images of the cluster of sentinel plants—estimate an insect pressure (e.g., measurable presence, distribution, magnitude) at this cluster. Thus, a pressure represents a measurable presence of a particular stressor.

As described above, a "pressure gradient" is referred to herein as a distribution of pressures of a stressor (or stressors) across multiple sentinel plants and/or sets (or clusters) of sentinel plants in an agricultural field. For example, a user may initially distribute three sets of sentinel plants within an agricultural field. Later, the computer system can access images of the agricultural field, recorded by an aerial sensor (e.g., a satellite), depicting the three sets of sentinel plants. Based on features extracted from regions of the image depicting each set of sentinel plants, the computer system can interpret a pressure gradient of a stressor in the agricultural field. More specifically, the computer system can: interpret a first pressure of the stressor in a first set of sentinel plants based on features extracted from a first region of the image depicting the first set of sentinel plants; interpret a second pressure of the stressor in a second set of sentinel plants based on features extracted from a second region of the image depicting the second set of sentinel plants; interpret a third pressure of the stressor in a third set of sentinel plants based on features extracted from a third region of the image depicting the third set of sentinel plants; and interpret the pressure gradient of the stressor in the agricultural field based on the first pressure, the second pressure, and the third pressure. Based on this pressure gradient, the computer system can interpret pressures of the stressor at various locations within the agricultural field (e.g., via interpolation).

As described above, a "user" is referred to herein as a person associated with an agricultural environment including sentinel plants, such as an agricultural field, a crop of plants, a greenhouse, an arboretum, or a laboratory. For example, a user may refer to a farmer associated with a particular agricultural field. In another example, a user may refer to an agronomist associated with a particular crop of plants. In another example, a user may refer to a scientist studying or developing sentinel plants and/or treatments of stressors in sentinel plants and non-sentinel plants.

4. Promoter and Reporter Pairs

A network of sentinel plants can be deployed to an agricultural field to communicate (e.g., visually, thermally, chemically) biotic and abiotic stressors in nearby crops, such as to a farmer, field operator, or agronomist. In particular, a sentinel plant can experience, react, and deteriorate in presence of certain plant stressors in the same or similar measures as comparable non-sentinel plants planted in the crop when exposed to these plant stressors and stressors. Therefore, the sentinel plant may function as an accurate sensor and predictor of disease and/or stressors in these nearby crops. For example, sentinel plants can be deployed to an agricultural field and planted with other non-sentinel plants—such as in clusters of sentinel plants surrounded by non-sentinel plants—in order to detect, measure, and communicate certain stressors in these sentinel plants, which may then be interpolated or extrapolated to stressors in nearby non-sentinel plants.

To generate a sentinel plant, plant cells can be genetically-modified to couple a known reporter gene with a certain biological process. Molecular genetic techniques can be implemented to associate an expression of the reporter gene with certain biological stresses and traits. Therefore, the reporter gene can act as a signal of a biological stress or trait in the plant cells. For example, the sentinel plant can be modified to fluoresce (i.e., absorb photons at one frequency and emit photons at a different frequency) in the presence of (and proportional to) a disease or stressor. In this example, the sentinel plant can be modified to fluoresce in the presence of one or more disease or stressors, such as: fungi, bacteria, nematode, parasites, viruses, insects, heat, water stress, nutrient stress, phytoplasmal disease, etc. In another example, the sentinel plant can be modified to signal presence of a stressor via bioluminescence of the sentinel plant. In yet another example, the sentinel plant can be modified to signal presence of a stressor via a pigmentation change of the sentinel plant.

Plant cells can be genetically-modified to include promoter and reporter pairs that indicate presence of certain stressors in a plant or crop of plants. A promoter includes genetic regulatory elements that drive expression of mRNA at a specific time and place that is subsequently translated into a functional protein. Promoter activity is representative of native biological processes that occur when a particular stress is present in the plant. To detect presence of these stressors, a known reporter gene that expresses a certain signal can be coupled to the promoter of choice. Therefore, when the plant's cells express the promoter associated with a certain stressor, the reporter tagged to the promoter is also expressed and thus detectable. Some fluorescent signals exist naturally in plants without genetic modification. These signals can be enhanced by selective breeding and/or other plant selection techniques. Each of these reporter genes can produce an optical signal that is distinguishable from the plant itself. A combination of reporter genes can be used as well, to indicate various plant stressors present in the plant or crop.

The promoter and reporter pairs can be implemented by tagging one reporter to one promoter. For example, if a red fluorescent protein is tagged to a promoter gene indicative of water stress in a sentinel plant, the promoter gene and therefore the red fluorescent protein can express in the plant cells when the water level in the plant cells falls below a minimum water potential. A computer system (e.g., a computer network, a remote server) can: access an image of a field containing the sentinel plant collected by various fixed or mobile, local or remote sensors (e.g., a fixed camera mounted to a pole in a field, a smartphone or tablet, a sensor mounted to a truck or 4×4, a sensor mounted to a drone or crop duster, a sensor mounted on a drone or plane, a camera integrated into a satellite); extract intensities of target wavelengths of red fluorescence—produced by a reporter protein in the sentinel plant in the presence of a water stressor—from this image; estimate a magnitude of a water stressor in this plant based on the intensity of the target wavelength of red fluorescence in this image. In response to this estimated pressure of the water stressor exceeding a threshold water pressure, the computer system can alert a field operator to address irrigation (e.g., under-irrigations) in a region of the field occupied by the sentinel plant. In this example, the computer system can: repeat this process to extract intensities of target wavelengths of red fluorescence from other regions of this same image or other concurrent images depicting other individual or clustered instances of this sentinel plant planted in other regions of this field; estimate pressure of the water stressor in these other regions of the field based on these intensities of the target wavelength of red fluorescence extracted from other regions of this image and/or from other concurrent images of the field; and interpolate or extrapolate a water pressure gradient across the entire field based on locations and pressures of water stressors indicated in these sentinel plants distributed throughout the field. Accordingly, the computer system can notify a field operator to address irrigation across the entire field or in targeted regions of the field based on this water pressure gradient. Furthermore, the computer system can: repeat this process over time to estimate water pressures or water pressure gradients in a region or across the entirety of the field; extrapolate future water pressures in the field based on the region-specific or field-wide water pressures thus derived from sequential images of sentinel plants occupying the field; and then prompt the field operator to preemptively address predicted future water pressure changes in the field well before a change in water pressure (substantively) affects crop yield from this field.

In one variation, multiple promoters can be tagged to one reporter such that the sentinel plant outputs a signal for a particular stressor over an extended duration of time. For example, a set of three promoters linked to water stress can be tagged with the red fluorescence protein reporter. At an initial time, presence of the first promoter can trigger the expression of the red fluorescence protein in response to a certain water pressure. At a second time, as the signal produced by the first promoter decreases, presence of the second promoter can trigger the continued expression of the red fluorescence. And again, at a third time, a third promoter can trigger the expression of the red fluorescence in the plant. Therefore, genetic engineering techniques can be implemented to string together multiple promoter genes and tag this string of promoters with a reporter gene for identifying which promoter genes are expressed in the plant, thus extending the detection window.

In one implementation, the sentinel plant can be configured to include a first quantity of promoters and a second quantity of reporters less than the first quantity of promoters. For example, expression of the red fluorescent protein can signal presence of a certain water pressure, and expression of the yellow fluorescent protein can signal presence of a certain heat pressure. However, the expression of both the red fluorescent protein and the yellow fluorescent protein can signal either presence of both a certain water pressure and heat pressure, or presence of a third pressure, such as a certain insect pressure. Therefore, fluorescence of the sentinel plant can be combined with knowledge of disease frequency, common disease locations, and common disease times to isolate a particular plant stressor present in the agricultural field. In another example, a first, second, and third fluorescing compound are each coupled to a first, second, and third biological process, respectively. Additionally, a fourth biological process is coupled to the first and second fluorescing compound; a fifth biological process is coupled to the second and third fluorescing compound, a sixth biological process is coupled to the first and third fluorescing compound; and a seventh biological process is coupled to the first, second, and third fluorescing compound. In this example, the detection of all three fluorescing compounds in a plant can signal each of the following: activation of the sixth biological process; activation of the first, second, and third biological process; activation of the first and fifth biological process; activation of the fourth and third biological process; activation of the sixth and second biological process. These biological processes can be distinguished to enable detection of different processes occurring in these plant cells—and therefore different stressors present at the plant. For example, the computer system can prompt the crop manager to treat all possible diseases or a specific disease that can be catastrophic if not treated quickly. In another example, a farmer or agronomist may retrieve a sample from the plant and test for each possible disease to initiate an appropriate course of action.

Similarly, plant cells can be genetically-modified to include combinatorial reporters that present different signals responsive to different stressors and/or pressures. The computer system can then leverage a model to interpret these signals, including deriving more information than the sum of this set of reporters, such as: a type of fungus in addition to presence of a fungal pressure; or proportion of water stress to heat stress.

4.1 Sentinel Plant

Figure 5:
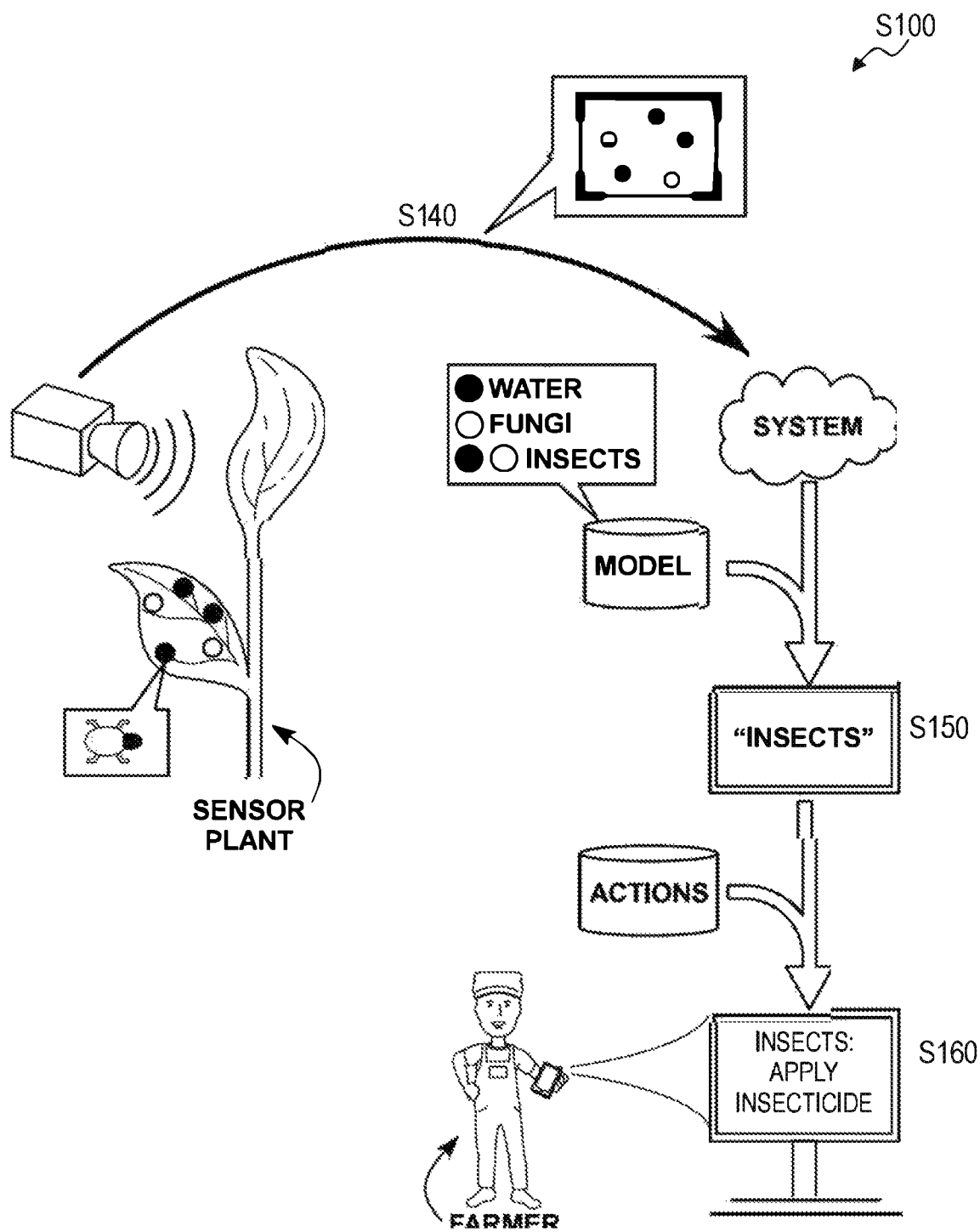
FIG. 5 is a graphical representation of the method.

As shown in FIG. 5, a sentinel plant includes a first promoter-reporter pair including: a first promoter that activates in the presence of a first stressor at the sentinel plant; and a first reporter coupled to the first promoter and configured to exhibit a first signal in the electromagnetic spectrum in response to activation of the first promoter by the first stressor.

In one variation, as shown in FIG. 5, the sentinel plant further includes a second promoter-reporter pair including: a second promoter that activates in the presence of a second stressor at the sentinel plant; a second reporter coupled to the second promoter and configured to exhibit a second signal in the electromagnetic spectrum in response to activation of the first promoter by the second stressor, the second signal different from the first signal.

In one variation, the sentinel plant further includes a third promoter that activates in the presence of a third stressor at the sentinel plant, the first reporter and the second reporter both coupled to the third promoter and configured to exhibit a third signal in the electromagnetic spectrum in response to activation of the third promoter by the third stressor, the third signal different from the first signal and the second signal.

One variation of the sentinel plant includes a first promoter-reporter pair including: a first promoter configured to activate in the presence of a first stressor within a first magnitude range at the sentinel plant; and a first reporter coupled to the first promoter and configured to exhibit a first signal in the electromagnetic spectrum in response to activation of the first promoter by the first stressor. In this variation, the sentinel plant also includes a second promoter-reporter pair including: a second promoter configured to activate in the presence of the first stressor within a second magnitude greater than the first magnitude range at the sentinel plant; and a second reporter coupled to the second promoter and configured to exhibit a second signal in the electromagnetic spectrum in response to activation of the second promoter by the second stressor.

Another variation of the sentinel plant includes: a first promoter that activates at a first time over a first duration in response to a first stressor presence in the sentinel plant; a second promoter that activates at a second time for a second duration in response to the first stressor presence in the sentinel plant, the second time succeeding the first and preceding the termination of the first duration; and a reporter coupled to the first and second promoter that, in response to activation of the first promoter, exhibits a first signal over the first duration for detection of the first stressor; and, in response to activation of the second promoter, exhibits a second signal over the second duration for detection of the first stressor.

5. Detection

The computer system can detect and interpret signals generated by sentinel plants by extracting features from images of sensor plants that correlate to presence of particular stressors at the sentinel plants.

Figure 7:
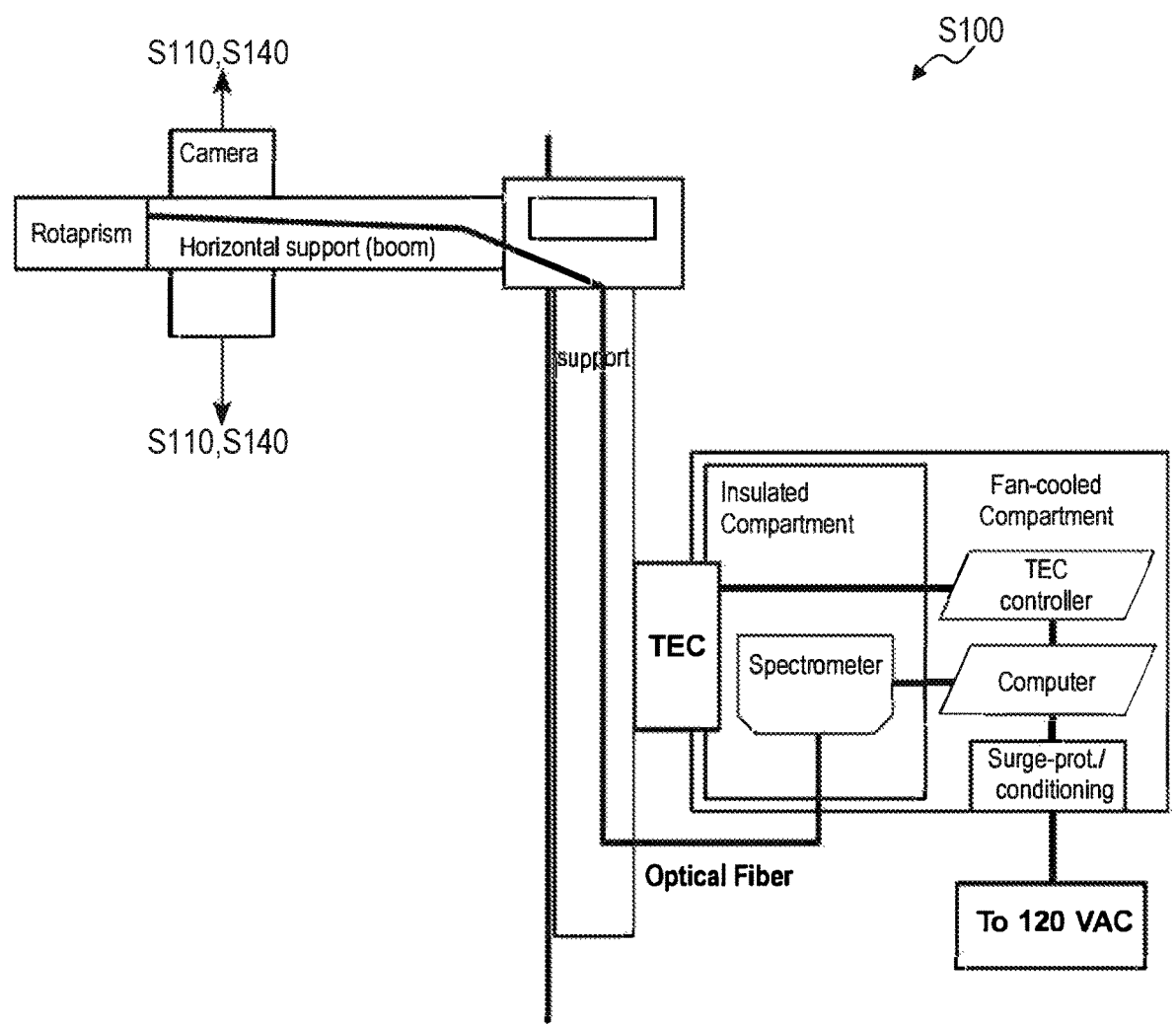
FIG. 7 is a schematic representation of a fixed optical sensor.

In one implementation, the computer system can access digital images (e.g., spectral images) of a sentinel plant(s) and/or plant canopy (e.g., sentinel plants and surrounding plants) captured by an optical sensor (e.g., a multispectral or hyperspectral imaging device) deployed at the sentinel plant(s) and/or plant canopy. For example, as shown in FIG. 7, the optical sensor can include: an optomechanical fore optic that enables measurement of fluorescent and non-fluorescent targets; and a digital spectrometer or digital camera that records images through the optomechanical fore optic. The computer system can thus access images recorded by the optical sensor and process these images according to the method S100 to detect reporter signals and interpret stressors present in these plants. More specifically, in this example, the computer system can: access images (e.g., spectral) of sentinel plants recorded by the digital spectrometer; extract wavelengths of the compounds of interest from these images; and identify stressors present at the sentinel plants based on these wavelengths.

The computer system can access images of sentinel plants captured by an optical sensor, such as from a handheld camera, a handheld spectrometer, a mobile phone, a satellite, or from any other device that includes a high-resolution spectrometer, includes band-specific filters, or is otherwise configured to detect wavelengths of electromagnetic radiation fluorescence, luminescence, or passed by the sentinel plant in the presence of a particular stressor.

The computer system can implement different instrumentation depending on the compound of interest, as the wavelengths of different compounds are each best observed under different conditions and may require distinct modes of detection. For example, the computer system can: access images, captured by a handheld spectrometer, of sentinel plants configured to emit red fluorescence in the presence of a stressor; and access images, captured by a handheld camera, of sentinel plants configured to exhibit a change in pigmentation in the presence of a stressor.

The computer system can access images of sentinel plants collected at particular times of day and/or time intervals so as to maximize detectability of signals generated by sentinel plants. For example, for a sentinel plant configured to produce a bioluminescent signal in the presence of a particular stressor or stressors, the computer system can access images of the sentinel plant collected at night when other signals generated by the sentinel plant and its surroundings are minimized.

5.1 Active/Passive Detection

The computer system can detect and interpret pressures of stressors in sentinel plants via active and/or passive modes of detection. For example, the computer system can implement passive detection to detect a signal generated by sentinel plants—without excitation of the sentinel plants—in the presence of a stressor or stressors. Alternatively, the computer system can implement active detection to detect a signal generated by sentinel plants—in response to excitation of the sentinel plant (e.g., via external illumination)—in the presence of a stressor or stressors. More specifically, the computer system can implement a detection method in which sentinel plants are illuminated in an oscillating light for excitation such that the response to that illumination can be isolated.

Figure 6:
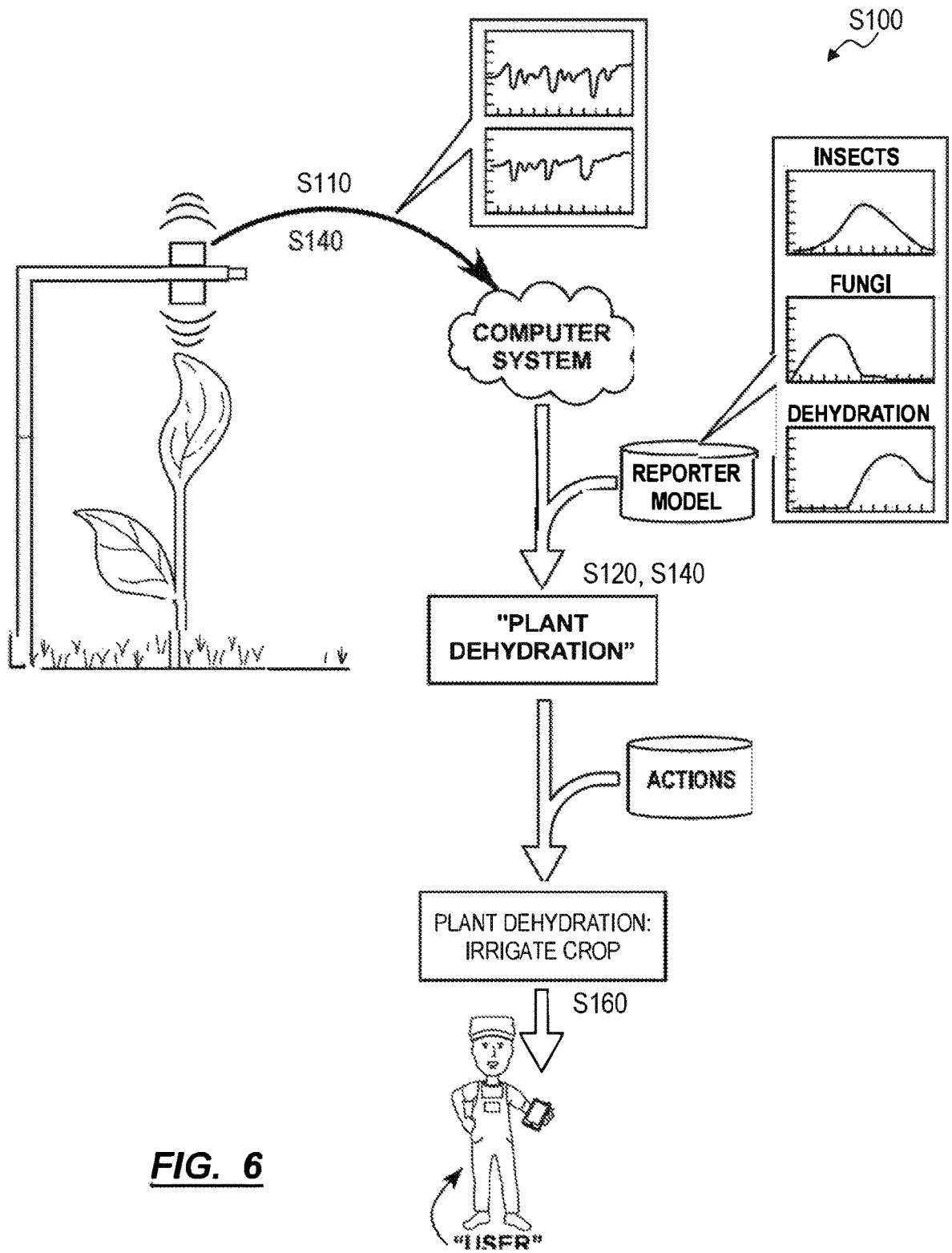
FIG. 6 is a graphical representation of the method.

In one variation, the computer system detects solar-induced fluorescent signals generated by sentinel plants via narrow-wavelength measurements near dark spectral features in incident solar radiation. Narrow band techniques associated with Fraunhofer lines (from absorption in the solar atmosphere) and Telluric lines (which originate from absorption of molecules in Earth's atmosphere) enable measurement of the optical signals in daylight, without implementing external illumination. Implementing this measurement technique allows for both specificity and accuracy of measuring small, obscure signals, as well as the ability to collect measurements both on the ground and airborne. Therefore, it is possible to collect images of the sentinel plants from a large range of distances. The computer system can detect these solar-induced fluorescent signals and extract insights into pressures of stressors at sentinel plants generating these signals. For example, as shown in FIGS. 5 and 6, the computer system can: access a first feed of spectral images captured by a first optical spectrometer; interpret a first pressure of a stressor in the first set of sentinel plants based on solar-induced fluorescence measurements extracted from a first image in the first feed of images; access a reporter model linking solar-induced fluorescence measurements extracted from spectral images to pressures of stressors for sentinel plants; and interpret a first pressure in the first set of sentinel plants based on a first solar-induced fluorescence measurement extracted from the first image.

5.2 Single-Plant Fixed Sensor

In one implementation, the computer system can access data from a single sentinel plant, in an agricultural field or greenhouse, recorded by a fixed sensor. For example, the computer system can access images collected by an optical sensor configured to install (e.g., clamp) onto a leaf or stalk of the sentinel plant and to capture close-range images of fluorescing surfaces on the sentinel plant at a high frequency (e.g., once per minute, once per hour). In these examples, the computer system can upload images to a remote database via a cellular network, or images can be downloaded to a mobile device or vehicle via a local ad hoc wireless network when a mobile device or vehicle is nearby, and then uploaded from the mobile device or vehicle to the remote database.

5.3 Fixed Cluster Sensor

In one implementation, the computer system can access images of a set (e.g., cluster) of sentinel plants collected by a fixed optical sensor facing the set of sentinel plants and installed (e.g., mounted) in the agricultural field. For example, the computer system can access images of a cluster of sentinel plants in an agricultural field recorded by an optical sensor mounted to a boom or column located in a center of the cluster of sentinel plants to capture close-range images of fluorescing surfaces on sentinel plants in the cluster of sentinel plants at a high frequency (e.g., once per hour, once per day). The computer system can extract insights from these close-range images of the cluster of sentinel plants to interpret pressures of a particular stressor(s) in this cluster of sentinel plants. Further, by interpreting pressures in the cluster of sentinel plants from images recorded by a fixed sensor located at the cluster, the computer system can extract insights into pressures in a subregion of the agricultural field including the cluster as well as adjacent subregions.

5.4 Handheld Sensor

In another implementation, a farmer may manually collect data for sentinel plants on a handheld device. For example, the computer system can access images of a first cluster of sentinel plant along an edge of an agricultural field collected by a mobile device (e.g., a smartphone) operated by a farmer associated with the agricultural field to capture close-range images of the cluster of sentinel plants at a lower frequency (e.g., once per week, biweekly). Additionally or alternatively, the computer system can access close-range images of a single sentinel plant in the cluster of sentinel plants. In this implementation, the computer system can upload images to a remote database via a cellular network or automatically upload images via a native or web-based agricultural application executing on the handheld device. The computer system can interpret pressures in this cluster of sentinel plants and/or single sentinel plant directly from features extracted from these close-range images to generate a high-resolution, short-interval time series representation of the health of this cluster of sentinel plants and/or single sentinel plant.

5.5 Ground-based Mobile Imaging

Alternatively, the computer system can implement ground-based mobile imaging to extract insights into the health of sentinel plants and cluster of sentinel plants by collecting images from optical sensors installed in manned or unmanned vehicles. For example, the computer system can access images of a cluster of sentinel plants collected by an optical sensor configured to install (e.g., mount) into a bed of a truck operated by a farmer associated with an agricultural field including the cluster of sentinel plants. In the example, the farmer may drive the truck along an edge of the agricultural field in order to capture images of the cluster of sentinel plants as the truck moves along the edge of the agricultural field. The computer system can then upload these images to the remote database, timestamped and georeferenced, and access these images upon upload or at a later time.

5.6 Aerial Imaging

In one implementation, the computer system can access images of a cluster of sentinel plants, multiple clusters of sentinel plants, and/or a crop of sentinel plants recorded by an aerial sensor configured to capture images of sentinel plants. For example, the computer system can access images of a crop of sentinel plants collected by an optical sensor configured to install (e.g., mount) onto a drone operated by an agronomist associated with the crop. Alternatively, in a crop of non-sentinel plants with clusters of sentinel plants, the farmer may operate a drone or dispatch an autonomous drone to scan regions of the crop where sentinel plant clusters are located to collect images of these sentinel plants.

In another implementation, the computer system can access images of a cluster of sentinel plants, multiple clusters of sentinel plants, and/or a crop of sentinel plants recorded by an aerial sensor (e.g., long-duration, high-altitude UAVs or a satellites such as OCO-2 or GOSAT) configured to capture long-range images of sentinel plants. For example, the computer system can access images collected by a satellite sensor configured to collect long-range images of sentinel plants at a low frequency (e.g., once per week, biweekly, once per month). In another example, the computer system can access images collected by a commercial satellite sensor configured to collect long-range images of sentinel plants at relatively higher frequencies (e.g., once per day, multiple times per week).

The computer system can implement any combination of these methods of data collection (e.g., instrumentation, frequency, range) to collect high-quality data that enable rapid, targeted responses to certain plant stressors and therefore increase yield of the non-sentinel plants nearby in the same agricultural field. For example, the computer system can access high-resolution images recorded by a high-resolution optical sensor (e.g., a RGB camera, a multispectral camera or spectrometer, a thermal or IR camera) mounted to a pole located in a center of a first cluster of sentinel plants in a crop and configured to capture high-resolution images of the sentinel plants at a high frequency (e.g., three times per day) each day and upload these images to a remote database. The computer system can extract features (e.g., intensity at particular wavelengths) from these high-resolution images to interpret pressures of a stressor at the first cluster of sentinel plants. Additionally, the computer system can access low-resolution images recorded by a satellite sensor configured to capture low-resolution images of the entire crop, including multiple sentinel plant clusters, at a low frequency (e.g., once per two-week interval). The computer system can extract features (e.g., intensity at particular wavelengths) from these low-resolution images to interpret pressures of the stressor at each cluster of sentinel plants in the crop. The computer system can derive a model linking pressures of the stressor at the first cluster of sentinel plants to the pressures of the stressor at other clusters in the crop based on the daily behavior of the first cluster and the biweekly behavior of all clusters of sentinel plants in the crop; and interpolate behavior of the crop as a whole in regions with or without sentinel plants.

6. Imaging Frequency

The computer system can access images of sentinel plants captured at set intervals or particular times of day in order to increase likelihood of detection of signals and to detect pressures of stressors in sensor plants and crops including sensor plants at early stages before these pressures expand in magnitude or negatively affect crop yield. For example, the computer system can access images of sensor plants in a crop recorded by optical sensors to monitor pressures of stressors indicative of plant health and to prompt users (e.g., a farmer) associated with the crop to mitigate these pressures once detected (e.g., above a threshold pressure). Alternatively, a user manually monitoring a crop may not visibly see or detect pressures of stressors in the crop until after a pressure has significantly damaged plants in the crop. Thus, the computer system can lower risk or probability of pressures spreading throughout a crop and across crops into other fields, and increase overall crop yield. Further, sentinel plants can be configured to output signals of relatively large magnitudes (e.g., greater intensity) responsive to pressures of stressors at relatively low magnitudes. Sentinel plants can include promoters configured to activate within hours of an initial infection or deficiency at the sensor plant. The computer system can then detect a signal generated from activation of the promoter in the sensor plant. Based on early detection of the signal, the computer system can recommend a minimal treatment to mitigate a pressure in the sensor plant.

The computer system can regularly monitor a set of sentinel plants at set frequencies such that pressures of stressors in sentinel plants are detected early while limiting cost and effort by users (e.g., farmers, agronomists) associated with an agricultural field including the set of sentinel plants. For example, the computer system can: access a feed of images of a set of sentinel plants in an agricultural field recorded at a set frequency (e.g., twice per day, daily, weekly); interpret a pressure of a stressor in the set of sentinel plants based on features extracted from a first image, in the first feed of images; and, in response to the pressure exceeding a threshold pressure, generate a prompt to a user associated with the agricultural field to address the stressor in plants occupying the agricultural field proximal the set of sentinel plants. In this example, if the pressure falls below the threshold pressure, the computer system can continue accessing images, in the first feed of images, at the set frequency, to continue monitoring the pressure of the stressor in the set of sentinel plants. Additionally and/or alternatively, the computer system can generate a prompt alerting the user of the pressure of the stressor. Thus, the computer system enables the user to regularly monitor health of sentinel plants and/or plants in agricultural fields associated with the user while minimizing physical travel to agricultural fields including sentinel plants, treating of sentinel plants, and/or testing of sentinel plant health by the user.

In one implementation, the computer system implements both high frequency and lower frequency measurements in order to more precisely interpret and predict pressures of stressors in sentinel plants and agricultural fields including sentinel plants. In this implementation, the computer system can combine high-resolution, short-interval time series representation of the health of this sentinel plant with features extracted from low-frequency, wider field-of-view images of clusters of plants or a whole field containing this sentinel plant to predict the health of multiple or all plants in this field. For example, the computer system can access a first feed of images recorded at a first frequency (e.g., twice per day, once per day, biweekly) by a fixed sensor facing a first set of sentinel plants in an agricultural field. Additionally, the computer system can access a second feed of images, of a region of the agricultural field including the first set of sentinel plants, recorded by a mobile sensor (e.g., deployed by a user associated with the agricultural field) at a second frequency less than the first frequency (e.g., weekly, every two weeks). From images in these feeds, the computer system can derive a model linking features extracted from images in the first feed of images to pressures of stressors at both the first set of sentinel plants and in the region of the agricultural field. Thus, the computer system can predict pressures across the region of the agricultural field at the first frequency based on features extracted from images in the first feed. The computer system can regularly confirm and/or rectify the model based on features extracted from images in the second feed at the second frequency.

7. Tagging Sentinel Plants

The computer system can extract features (e.g., intensities at particular wavelengths) from images of a sentinel plant(s), a cluster of sentinel plant(s), and/or an agricultural field including sentinel plants to interpret pressures of stressors in these sentinel plants. In order to extract these features, the computer system can distinguish sentinel plants from non-sentinel plants in these images.

In one implementation, the computer system can identify locations in agricultural fields that include sentinel plants and extract features from images or regions of images corresponding to these locations. For example, the computer system can access georeferenced images of clusters of sentinel plants in an agricultural field recorded by a ground-based mobile sensor. The computer system can: access a position and orientation of the ground-based mobile sensor when the images were captured; access a set of GPS coordinates corresponding to locations of clusters of sentinel plants in the agricultural field; and identify clusters of sentinel plants in the images based on the position and orientation of the ground-based mobile sensor and the GPS coordinates of the clusters of sentinel plants.

In another implementation, the computer system can identify sentinel plants in images of sentinel plants and non-sentinel plants based on a baseline signal generated only by sentinel plants. For example, sentinel plants can be configured to generate a baseline signal within a first wavelength band at which non-sentinel plants do not generate any signal. Further, these sentinel plants can be configured to generate a signal within a second wavelength band responsive to pressures of a stressor at the sentinel plant, the second wavelength band distinct from the first wavelength band. Thus, the computer system can check subregions of images of clusters of sentinel plants or crops including sentinel plants for this baseline signal within the first wavelength band, to identify regions of the images including sentinel plants and/or clusters of sentinel plants.

In another implementation, the computer system can identify sentinel plants in aerial images of crops (e.g., sentinel plants and non-sentinel plants) by overlaying images with a mask configured to hide non-sentinel plants and highlight sentinel plants. For example, the computer system can generate a mask for a particular agricultural field including five clusters of sentinel plants distributed throughout the agricultural field, the mask defining an opaque layer including five transparent regions corresponding to the five clusters. The computer system can then: overlay the mask over an image of the crop captured by an aerial sensor; apply null pixel values to regions of the crop covered by the opaque layer; and extract features (e.g., intensity measurements) from the five transparent regions corresponding to the five clusters of sentinel plants in the crop.

7.1 Feature Extraction

Figure 4:
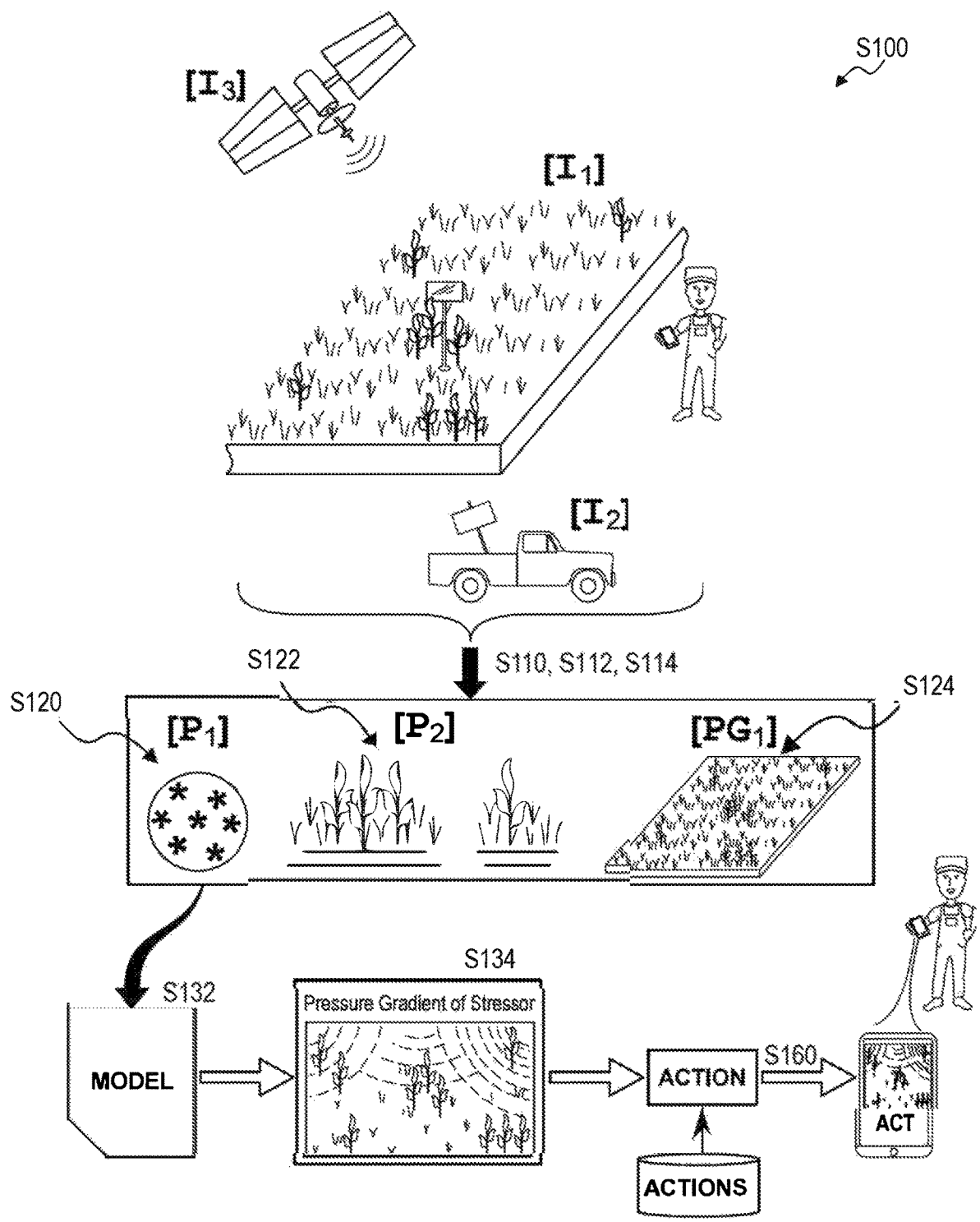
FIG. 4 is a graphical representation of the method.

As shown in FIGS. 4, 5, and 6, the computer system can extract features from these images of sentinel plants to interpret pressures in sentinel plants. For example, the computer system can: access a first feed of images of a first set of sentinel plants in an agricultural field; and interpret a first pressure of a stressor in the first set of sentinel plants based on a first set of features extracted from a first image, in the first feed of images. More specifically, the computer system can: extract a first feature, in the first set of features, from the first image, the first feature corresponding to a first pixel of the first image; extract a second feature, in the set of features, from the first image, the second feature corresponding to a second pixel of the first image; and estimate a representative feature based on a combination of the first feature and the second feature; access a reporter model linking features extracted from images in the first feed to pressures of the first stressor at the first set of sentinel plants; and interpret the first pressure of the first stressor in the first set of sentinel plants based on the representative feature and the reporter model. Thus, based on features extracted from images collected by the optical sensor, the computer system can interpret a pressure of a stressor at a sentinel plant or sentinel plants based on a reporter model linking characteristics (e.g., intensity of wavelength) to a particular stressor (e.g., insects, heat, fungi) and/or pressure of the particular stressor.

8. Sentinel Plant Distribution

In one implementation, each sentinel plant type for a particular crop is configured to produce a signal responsive to one plant stressor—that is, one sentinel plant type includes one promoter-reporter pair configured to produce a signal for one type of stressor. For example, a first sentinel plant type for a particular crop (e.g., corn) includes a promoter-reporter pair configured to output a signal responsive to a fungi pressure; and a second sentinel plant type for this particular crop includes a different promoter-reporter pair configured to output a signal responsive to an insect pressure.

In another implementation, promoter-reporter pairs configured to output signals for multiple distinct stressors are integrated into one sentinel plant type for a particular crop. For example, one sentinel plant type for a particular crop contains promoter-reporter pairs configured to produce: a luminescent signal responsive to fungi pressure; a pigmentation change responsive to insect pressure; and a red fluorescence signal responsive to phosphorus deficiency. Thus, one plant or cluster of plants of this sentinel plant type can be sensed to detect multiple discrete pressures.

In one variation, the sentinel plants can be planted in clusters—rather than mixed with the non-sentinel plant seeds—when a field is planted. In particular, rather than mixing seeds of a sentinel plant for a particular stressor with the non-sentinel seeds of the same or similar plant type prior to planting, and these sentinel plants seeds can be planted in clusters in designated sentinel plant seed regions in the field, such as in specific crop rows (e.g., every $50^{th}$ crop row) or in target segments of crop rows (e.g., three-row-wide, three-meter-long clusters with a minimum of 20 crop rows or 20 meters between adjacent clusters of sentinel plants). Thus, by clustering these sentinel plants, adjacent or surrounded by non-sentinel plants in the same field, stress-related signals produced by these sentinel plants may exhibit high contrast with adjacent non-sentinel plants and thus yield a high signal-to-noise ratio for presence of the particular stressor in the field. For example, by planting multiple instances of the sentinel plant in a small region of the field, a red fluorescing reporter output by these sentinel plants may be more easily distinguished against a non-fluorescent background of adjacent non-sentinel plants. Similarly, if multiple sentinel plants are planted in one row in the field, this cluster of sentinel plants can produce a cumulative signal—indicating presence of an insect pressure as the insect pressure migrates across a crop—characterized by a greater signal-to-noise ratio than a lone sentinel plant in this row, and this cluster of sentinel plants may also yield greater spatial information regarding direction and scope of the insect pressure moving across the field than a lone sentinel plant in this row.

Clusters of sentinel plants can be planted with non-sentinel plant crops in the field, wherein clusters of sentinel plants contain at least one sentinel plants for each stressor or in which each sentinel plant includes a promoter for each plant stressor. For example, batches of sentinel plant seeds—including at least one seed containing a promoter for at least one stressor—can be planted in clusters in a field with other non-sentinel plants. In another implementation, clusters of sentinel plant seeds are grouped by promoter. In this implementation, a first cluster of water pressure sensing seeds, a second cluster of fungi pressure sensing seeds, and a third cluster of insect pressure sensing seeds are planted in discrete groups in the field. In this implementation in which the sentinel plant seeds containing the same reporter are planted together in clusters, these clusters may output stronger, higher-amplitude, lower noise signals that are more easily identifiable by a fixed, local-mobile, or remote sensor when a corresponding pressure is present in the field.

The location of sentinel plant clusters can also be selected to enable detection of certain plant stressors with greater accuracy and/or reduced noise. In one example in which an agronomist or a farmer is physically present to collect stressor data from a field—such as via a sensor mounted on a vehicle or via a handheld device—the clusters of sentinel plants can be planted near the edges of the crop to enable quick access for the farmer. In this example, because sentinel plant clusters are located near the edge of a crop, a farmer may collect samples from these sentinel plants and test these samples directly for plant stressors in order to verify pressures indicated by reporters in these sentinel plant clusters. In another example, sentinel plants are planted in the center of the crop to increase proximity to each plant in the crop, and therefore potentially increase sensing capabilities or the likelihood of detecting a disease migrating across the crop.

In yet another example, if a farmer's crop shares an edge with another farmer's crop, it might be desirable to plant a row of insect pressure sentinel plants along the shared edge in order to quickly detect a migrating insect population immediately as they enter the crop. In another example, if there is a lower elevation portion of a crop, a cluster of water pressure sentinel plants may be planted in this area, in order to detect when this area is collecting an excess amount of water. A cluster can also be planted at the highest elevation portion of the crop, where plant dehydration might be prevalent.

In the implementation described above in which sentinel plants are distributed in clusters throughout a field, the sentinel plants can be identified and distinguishable from the non-sentinel plants in order to improve efficiency of data collection. For example, if a farmer is using a handheld device to collect images of the clusters on a weekly basis, a marker can be placed in the field such that the cluster is easily located. In another example, where satellite images are used to collect images of crops, the coordinate location of clusters can be obtained in order to collect wavelength measurements of the sentinel plants.

In another implementation, the sentinel plant seeds are mixed with the non-sentinel plant seeds and also planted together in clusters. The clusters of solely sentinel plant seeds can be evenly distributed throughout a crop or in optimized locations. The sentinel plant seeds can be mixed with the non-sentinel plant seeds such that the mixed seeds are approximately 2 percent sentinel plant seeds. The clusters of sentinel plants can be analyzed more frequently, such as by a drone that scans the clusters of sentinel plants each day to collect aerial images. A satellite can collect images of the crop as a whole less frequently, collecting data for both the clusters of sentinel plants and the individual sentinel plants mixed in with the rest of the crop. The health of the entire crop or agricultural field can be predicted by the computer system based on the timestamped and georeferenced images of the sentinel plants.

In one implementation, sentinel plants can be transplanted as seedlings into a crop. For example, a sentinel strawberry plant may be initially transplanted as a seedling to a field of strawberry plants. In another implementation, sentinel plants can be sown as seeds into a crop. For example, a sentinel soybean plant may be initially sown as a seed into a crop of soybean plants. In yet another implementation, sentinel plants can be grafted onto existing perennial crops. For example, a sentinel grape scion sensor can be grafted to a grape producing vine.

8.1 Variation: Sterile Sentinel Plants

Sentinel plants can be genetically-modified to be sterile, or non-flowering. Sterile sentinel plants can be grown in GMO or non-GMO crops, as they will not reproduce. A small percentage of a field can be planted with the sterile sentinel plant seeds, while the rest of the crop is planted with standard non-sentinel plant seeds. For example, a farmer planting a crop of corn may plant 2-5% of a crop as the genetically-modified sterile sensing corn plants and the remaining 95-98% of the crop as the standard non-sterile corn plants. Before planting, the different sentinel plant types can be mixed together at an appropriate ratio such that the sterile seeds are approximately 2-5% of the total seeds planted. When the crops grow, the sterile plants will be randomly distributed throughout the crop to produce an approximately even distribution of sterile plants in the crop. In this example, each plant stressor can be detected in each area of the crop either by having one sentinel plant type that contains all the selected promoters, or by separating the promoters into different plant seeds. In this implementation, incorporating all selected promoters into one plant may be advantageous, such that multiple plants with the same reporter can be in close proximity, therefore increasing the strength of a signal produced by the reporters.

The percentage of sterile sentinel plant seeds in the seed mixture can be manipulated to optimize the crop yield. Sterile sentinel plant seeds will result in a loss of yield for the farmer, as the sterile plants will not produce fruit. However, the farm can use data collected from the sentinel plants to improve the yield of the next crop. For example, a farmer may plant a crop of corn with 100% non-sterile corn seed ("normal" corn seed) and may anticipate an average crop yield of 88% over a ten-year period given that 12% of the crop may be lost or fail on average over a long period of time due to diseases and other pressures. To increase yield over this period of time, the farmer may plant the field with a mixture of 5% sterile sentinel corn seed and 95% non-sterile, non-sentinel corn seed. Though 5% yield from the field may be initially lost due to application of sterile sentinel corn seed, these sterile sentinel plants may enable early detection and response to various pressures that previously resulted in 10% average yield loss of the crop over several years, and thus enable the farmer to reduce loss resulting from disease and other pressures to less than 1%, thereby increasing total average yield over multiple years to approximately 94%.

In one implementation, the sterile sentinel plant seeds replace a portion of and/or all refuge seeds present in a seed mixture. For example, a seed mixture can be mixed to include a first percentage (e.g. 2% to 10%) of sterile sentinel refuge seeds and a second percentage of GMO seeds, the refuge seeds configured to prevent pathogen and weed resistance to the GMO seeds. In this example, sterile sentinel plant seeds can be incorporated in the seed mixture as the refuge seeds, thus limiting any loss of crop yield due to implementation of sterile sentinel plants.

Similarly, stressors signaled by these sterile sentinel plants may enable the farmer to enact rapid responses that initially reduce average crop loss from 10% to 5% such that the farmer initially achieves the same average yield but enables the computer system to collect a relatively large amount of data from these deployed sterile sentinel plants. Over time, as the computer system collects additional stressor information from the field based on signals produced by deployed sterile sentinel plants over multiple seasons, the computer system can recommend smaller ratios of sterile to non-sterile plants while continuing to output preemptive prompts to address early-stage stressors in the field, thereby enabling the farmer to reduce yield loss due to both incorporation of sterile plants and stressors in the field and thus achieve higher average yield for the crop over time. Therefore, the computer system can indicate target minimum proportions of sterile sentinel plant seeds to non-sterile, non-sentinel seeds to plant in the field in order to achieve minimum pressure sensing capabilities for long term yield protection while minimizing immediate yield loss.

8.2 Non-Sterile Sentinel Plants

In one implementation, seeds for these sentinel plants are non-sterile. In this variation, non-sterile sentinel plant seeds can also be planted in clusters—alongside non-sentinel plants bearing the same fruit or of similar crop types—according to methods and techniques described above for sterile sentinel plant seeds in order to maintain high signal-to-noise ratios and sensing capabilities for this crop while limiting total seeding cost (e.g., for sensing seeds of a greater cost than the non-sentinel seeds bearing the same fruit).

Alternatively, in this variation, sensing traits can be incorporated into a non-sterile GMO plant genome as part of a GMO stack already present in GMO seeds, which can then be planted to produce an entire crop of sentinel plants. However, in this variation, these non-sterile sentinel plant seeds can be configured to generate several distinct signals that represent an array of stresses and can be planted in clusters within the field—as described above—wherein all plants in one cluster contain the same promoter-reporter pair(s) configured to produce a signal for a particular biotic or abiotic stressor (or a particular set of biotic and/or abiotic stressors). For example, non-sterile sentinel plant seeds containing the same promoter-reporter pairs are planted along the full length of one crop row in the field with non-sterile sentinel plant seeds in the two adjacent crops rows containing different promoter-reporter pairs configured to produce signals for different biotic or abiotic stressors; in this example, this pattern of rows containing seeds with different promoter-reporter pairs is repeated along the full length of the field. In another example, non-sterile sentinel plant seeds containing the same promoter-reporter pairs are planted in rectilinear clusters, such as in adjacent five-meter-long segments of five consecutive crop rows with non-sterile sentinel plant seeds in the adjacent clusters containing different promoter-reporter pairs configured to produce signals for different biotic or abiotic stressors; in this example, this grid around of clusters of non-sterile sentinel plants seeds containing the same promoter-reporter pairs is repeated along the full length and width of the field.

By thus clustering non-sterile sentinel plants in one-dimensional or two-dimensional groups of plants configured to produce signals for the same stressors, the crop as a whole can produce high-amplitude signals—characterized by high signal-to-noise ratios—for multiple different biotic and/or abiotic stressors in discrete rows or regions of the field. As described above, stressors indicated by these rows or clusters of plants configured to produce signals for the same stressors can then be interpolated or extrapolated across the entire field to predict pressures across the entire crop.

Therefore, in this variation, because each plant in the field exhibits sensing capabilities, the entire crop can be monitored directly, the computer system can generate a pressure map of biotic and/or abiotic stressors for the crop as a whole based on signals produced by these plants during one period of time (e.g., on one day) and detected by a fixed or mobile local or remote sensors. By repeating this process to develop new pressure maps for the field over time, the computer system can monitor stressors across the field over time and serve data and/or recommendations for proactive mitigation of these stressors. The computer system can also implement this process to update the pressure map for the field following a stressor treatment at the field, thereby enabling a field operator to directly assess efficacy of this stressor treatment and to make more informed treatment decisions for the field in the future. Further, once applying a particular treatment to the field based on these interpreted pressures, the computer system can continue to measure and detect signals generated by the sentinel plants and therefore assess efficacy of the particular treatment based on new pressures interpreted from these signals.

8.3 Plant Grafts

In one implementation, rather than planting the sentinel plants as seeds (such as in row crops), the sentinel plants can be grafted onto existing plants. Grafting may be useful for perennial crops and other high value crops, such as almond trees or grape vines. A scion or leafy portion of the sentinel plant may be grafted into a portion of the desired plant, for example on the middle portion of a tree trunk. For example, a scion of a sentinel grape vine can be grafted into the trunk of a mature grape, such that the scion portion of the mature grape vine can implement the sensing technology, providing a representation of the health of the mature grape vine As grafting sentinel plants into existing plants is, initially, a more time consuming process, the grafting method may be useful for perennial crops, which do not require replanting each year. These plants are trimmed at the end of each season but, when the leaves bloom the following season, the sensing capabilities will still be present. Therefore, the grafts only need one application to last the lifetime of the plant.

The location of sensors in these perennial or high value crops can also be optimized, similarly to the row crops. Multiple grafts can be applied to one plant, to include each selected promoter and reporter in each grafted plant. Alternatively, specific reporter grafts can be selected for plants in different crop regions based on the likelihood of certain plant stressors appearing in different crop regions. As the grafts are applied to grown plants, it may be beneficial to locate the sensors near the edges of a crop, for ease of application.

8.4 Controlled Environment Agriculture Applications

In one variation, sentinel plants can be grown in a controlled environment, such as a greenhouse (e.g., glass roof or factory farm) or another enclosed growing structure. Sentinel plants grown in controlled environments can be regularly monitored for detection of pressures of stressors at the sentinel plants. In one implementation, sentinel plants can be grown in an enclosed growing structure via vertical farming.

Sentinel plants grown in these controlled environments can be transplanted to other locations (e.g., commercial agricultural fields) to serve as sentinel plants. Alternatively, sentinel plants grown in controlled environments can be monitored for detection of pressures of a stressor or stressors under particular controlled environmental conditions (e.g., climate, region, presence of other plants) in the controlled environment. The computer system can interpret pressures in these sentinel plants in the greenhouse environment and extract insights into plants (e.g., in an agricultural field) under similar environmental conditions based on pressures in the sentinel plants.

The computer system can more frequently monitor sentinel plants in a controlled environment than sentinel plants located in an agricultural field due to the smaller area of the greenhouse environment. Therefore, the computer system can extract further insights into these sentinel plants grown in the controlled environment. For example, by interpreting daily pressures of a particular stressor in sentinel plants in a greenhouse, the computer system can more precisely converge on a model linking features extracted from images collected of the sentinel plants to pressures of the particular stressor. The computer system can then better model pressures of the particular stressor in an agricultural field including sentinel plants of a same type and/or including these sentinel plants once transplanted by a user associated with agricultural field.

9. Outputs

The computer system can: access images (e.g., spectral) of the sentinel plants; extract features indicative of stressors and pressures corresponding to these stressors in these sentinel plants; interpolate or extrapolate pressures of particular stressors in these sentinel plants to other plants (e.g., sensor and non-sentinel plants) in the same agricultural field (and in nearby fields); and then generate real-time prompts or treatment decisions for these crops in order to increase efficiency of crop treatments and maintenance over time and maintain or increase yield from the agricultural field.

In one implementation, the computer system: extracts wavelength measurements for specific compounds in a region of an image depicting a cluster of sentinel plant; and transforms these wavelength measurements into a pressure (e.g., presence, magnitude) of a particular stressor or stressors in this cluster of sentinel plants. For example, if the computer system detects—in this region of the image—a specific wavelength for a compound associated with a fungal disease, the computer system can access a model linking wavelength of the compound of interest to the fungal stressor and then pass the intensity of this wavelength in this region of the image into the model to estimate the fungal pressure (e.g., in the form of "percent" pressure) in this cluster of sentinel plants. Based on the fungal pressure for the specific sentinel plant, the computer system can generate a prediction of the fungal pressure for non-sentinel plants surrounding or nearby this cluster of sentinel plants.

In the foregoing example, to generate the model linking intensity of wavelengths to pressures of stressors, a farmer may collect samples from a leaf or the soil sentinel plant to detect plant stressors. The samples can be tested to identify the specific type and pressure of a stressor present at the leaf, while the wavelength of the compound in the plants associated with the disease can be measured from the images collected. A model depicting the relationship between the detected wavelength of the compounds of interest and the pressure magnitude can then be generated (e.g., by the computer system) based on these empirical data. Subsequently, the computer system can automatically (and autonomously) predict pressures throughout the crop based on features extracted from images of the cluster of sentinel plants rather than based on physical samples collected by the farmer. Alternatively, this model can be generated based on lab data prior to deployment of the sentinel plants to the agricultural field and can be linked to deployed sentinel plants during the subsequent growing season.

In a crop with multiple clusters of sentinel plants or with sentinel plants distributed throughout the crop, the images collected both on the ground and aerially can be accessed by the computer system to output a pressure map for the crop. The pressure map can display the locations of specific disease and stressors, and can be updated or combined to display the spread or elimination of certain pressures over time. The map can display interpolated pressure data for regions of the crop where no sentinel plants are located. In one implementation, images can be collected multiple times per day from a camera located on a pole in the center of a cluster of sentinel plants. Additionally, satellite images of the entire crop, including other sentinel plant clusters, can be collected biweekly. The data collected daily from the single cluster can be used to model the behavior of the other clusters, based on the biweekly wavelength measurements of disease compounds in the rest of the clusters. The regions of the crop between clusters, or the "non-sentinel" regions, can also be modeled by interpolation (e.g., via machine learning algorithms). To confirm presence of a stressor and to interpret a pressure of this stressor, a farmer may collect samples of the sentinel plant itself or of the surrounding soil.

For example, the computer system can access a feed of images from a remote database, the first feed of images timestamped and georeferenced, and uploaded to the remote database via a wireless network from a device located on a post in the center of a first cluster of sentinel plants in an agricultural field at a frequency of one image every hour; access satellite images of the agricultural field, including a set of clusters of sentinel plants, the satellite images collected biweekly; interpret a pressure of a stressor in the first cluster based on the model linking features extracted from the feed of images to stressor and pressures of stressors; interpolate the pressure of the set of clusters and of all plants (e.g., sterile and non-sterile plants) in the agricultural field, based on the model and the feed of images from the remote database and the satellite images; generate a pressure map including locations of a pressure in an agricultural field; magnitude of the pressure; locations of sentinel plant clusters; a first timestamp indicating the time the map is generated and a second timestamp indicating a time for which the map is representative; generate prompts or treatment recommendations for this agricultural field based on the pressure map; and, deliver the pressure map and corresponding prompts or treatment recommendations to an operator of the agricultural field.

After generating a pressure map based on the measured wavelengths of specific compounds in the plants, the computer system can prompt an operator of the agricultural field to take certain actions in order to combat plant stressors. In one implementation, a farmer may plant a row of insect sentinel plant seeds on an edge of a soybean field, for monitoring the border between the farmer's crop and a neighboring crop. Each day, an optical device mounted to a pole in the row of sentinel plants can capture images of the sentinel plants. From these images, the computer system can measure the wavelengths of compounds associated with the insect related disease, and display a certain insect pressure magnitude on the edge of the map where the row of sentinel plants is located. Based on the insect pressure magnitude and the times at which images were collected, the computer system can display a predicted current insect pressure magnitude for the surrounding area in the crop and prompt the farmer to make certain decisions such as: whether to treat the crop with insecticide for the insects dependent on the pressure magnitude reading; which areas of the crop to treat for insect disease; and an extent of treatment in different regions of the crop. After initial treatment, as more images are collected and more data becomes available, the computer system can update the pressure map and prompt the farmer to implement an updated treatment plan with this new information, and make improved treatment decisions for future insect related diseases. The output pressure map provides a means for the farmer to be alerted to a disease or stress in the crop at the onset, as well as access predictions for what may happen in response to certain treatments or to applying no treatment. Over time, as more data is collected and various treatments are applied to the crop based on stressors indicated by signals output by sentinel plants in the field, the computer system can develop models to predict responses of plants and plant stressors to certain treatments, such as a magnitude change in signal output by a sentinel plant for a known stressor responsive to a particular magnitude of treatment applied to the field.

The computer system can generate real-time prompts or treatment decisions for these crops in order to increase efficiency of crop treatments and maintenance over time and maintain or increase yield from the agricultural field. For example, in response to interpreting a pressure of a particular stressor, in a set of sentinel plants, above a threshold pressure, the computer system can generate a prompt to address the particular stressor in plants proximal the set of sentinel plants. More specifically, the computer system can: isolate a first action, in a set of actions defined for sentinel plants, linked to the particular stressor; and transmit a notification to perform the first action in the agricultural field to mitigate the particular stressor to a computing device of a user associated with the agricultural field. Thus, the computer system can update users (e.g., agronomists, farmers, field owners) regarding plant health and/or suggest treatments for mitigating pressures of stressors in plants.

9.1 Pressure Model

In one variation, as shown in FIG. 1, the computer system can derive a pressure model linking pressures of a particular stressor at a first set of sentinel plants (e.g., one sentinel plant, a cluster of sentinel plants) to pressures of the particular stressor at the second set of sentinel plants. By developing this pressure model, the computer system can minimize data collection of all sentinel plants in a particular region (e.g., agricultural field) by relating pressures in sentinel plants in a single set of sentinel plants to other sets of sentinel plants in the agricultural field.

For example, the computer system can: access a first feed of images recorded at a first frequency by a fixed sensor (e.g., a camera mounted to a beam in a center of an agricultural field) facing a first set of sentinel plants in an agricultural field; access a second image of a second set of sentinel plants in the agricultural field, the second image recorded by a mobile sensor (e.g., camera of a mobile device of a user associated with the agricultural field) during a first time period; interpret a first pressure of a stressor in the first set of sentinel plants during the first time period based on a first set of features extracted from a first image, in the first feed of images, captured during the first time period; and interpret a second pressure of the stressor in the second set of sentinel plants during the first time period based on a second set of features extracted from the second image. Based on the first pressure interpreted at the first set of sentinel plants and the second pressure interpreted at the second set of sentinel plants, the computer system can derive a pressure model associating pressure of the stressor at the first set of sentinel plants with pressure of the stressor at the second set of sentinel plants.

Once the computer system derives the pressure model, the computer system can continue accessing images from the first feed to interpret pressures at the first set of sentinel plants and at the second set of sentinel plants based on the model. For example, during a second time period, the computer system can: interpret a third pressure of the stressor in the first set of sentinel plants based on a third set of features extracted from a third image, in the first feed of images, captured during the second time period; and predict a fourth pressure of the stressor in the second set of sentinel plants during the second time period based on the third pressure and the model. Therefore, the computer system can predict pressure at the second set of sentinel plants based on images of the first set of sentinel plants from the first feed, without accessing additional images of the second set of sentinel plants. Alternatively, the computer system can continue collecting images of the second set of sentinel plants at a second frequency less than the first frequency to ensure precision of the pressure model and to update the pressure model over time. Further, the computer system can collect images of other sets of sentinel plants and develop additional pressure models linking pressures in sentinel plants of these other sets of sentinel plants across the particular region to the first set of sentinel plants in the agricultural field, thus enabling predictions of pressures of the particular stressor in the set of sentinel plants across the agricultural field based on information extracted from images of the first set of sentinel plants.

Based on this predicted fourth pressure at the second set of sentinel plants, the computer system can generate a prompt or transmit a notification to a user associated with the agricultural field. For example, in response to the fourth pressure in the second set of sentinel plants exceeding a threshold pressure, the computer system can generate a prompt to address the stressor in plants proximal the second set of sentinel plants in the agricultural field.

9.2 Gradient Model

In one variation, as shown in FIGS. 2 and 3, the computer system can derive a gradient model associating pressures of a particular stressor at a first set of sentinel plants (e.g., one sentinel plant, a cluster of sentinel plants) to pressures at subregions of an agricultural field including the first set of sentinel plants (e.g., a pressure gradient in the agricultural field). By developing this gradient model, the computer system can minimize data collection of all sentinel plants in a particular region (e.g., agricultural field) by relating pressure gradients in the particular region (e.g., pressures in sentinel plants across the particular region) to a single set of sentinel plants in the agricultural field. Further, the computer system can correct for deviations in pressures interpreted at the first set of sentinel plants based on the gradient model.

For example, the computer system can: access a first feed of images recorded at a first frequency by a fixed sensor (e.g., a camera mounted to a pole in an agricultural field) facing a first set of sentinel plants in an agricultural field; access a second image of a region of the agricultural field comprising the first set of sentinel plants, the second image recorded by a mobile sensor (e.g., an aerial sensor, a drone, a satellite) during a first time period; interpret a first pressure of a stressor in the first set of sentinel plants during the first time period based on a first set of features extracted from a first image, in the first feed of images, captured during the first time period; interpret a first pressure gradient of the stressor in sentinel plants in the region of the agricultural field during the first time period based on a second set of features extracted from the second image; and derive a gradient model associating pressure of the stressor at the first set of sentinel plants and pressure gradient of the stressor in the region of the agricultural field based on the first pressure of the stressor and the first pressure gradient.

Upon deriving the gradient model, the computer system can rectify the first pressure gradient based on the first pressure of the stressor at the first set of sentinel plants and the gradient model. Further, the computer system can predict pressure gradients of the particular stressor based on features extracted from images in the first feed. For example, the computer system can: interpret a second pressure of the stressor in the first set of sentinel plants during a second time period based on a third set of features extracted from a third image, in the first feed of images, captured during the second time period; and predict a second pressure gradient of the stressor in the region of the agricultural field during the second time period based on the second pressure and the model.

From this pressure gradient, the computer system can monitor pressures at various subregions of the agricultural field. If the computer system predicts a high pressure of the particular stressor at a particular subregion of the agricultural field, the computer system can flag this subregion and generate a prompt to a user associated with the agricultural field to address the particular stressor in this subregion. For example, the computer system can, in response to the second pressure gradient predicting a third pressure in a subregion of the agricultural field and exceeding a threshold pressure, generate a prompt to address the stressor in plants occupying the agricultural field proximal the subregion of the agricultural field. Further, based on the pressure gradient, the computer system can generate a pressure map. The computer system can include this pressure map in the prompt for the user.

Further, the computer system can refine the gradient model by interpreting pressures from additional sets of sentinel plants in the agricultural field. In one implementation, the entire agricultural field is sentinel plants (e.g., having no non-sentinel plants). In this implementation, the computer system interprets the first pressure gradient based on features extracted from the second image recorded by a mobile sensor. The computer system can combine this low-resolution pressure gradient data for the entire agricultural field of sentinel plants with the high-resolution pressure data for the first set of sentinel plants to develop a more precise gradient model for predicting pressure gradients of the entire agricultural field.

In another implementation, in which clusters of sentinel plants are planted within an agricultural field of non-sentinel plants, the computer system can interpret the first pressure gradient based on features extracted from regions of the second image, recorded by the mobile sensor, regions including the first set of sentinel plants and (at minimum) a second set of sentinel plants. In this implementation, the computer system can interpret a pressure of the particular stressor at the first set of sentinel plants based on the first image and interpret a second pressure of the particular stressor at the first set of sentinel plants based on the second image. The computer system can then: derive a gradient model associating pressure of the particular stressor at the first set of sentinel plants with pressure gradient of the first stressor in the agricultural field based on the second pressure and the first pressure gradient, both extracted from the second image; and rectify the first pressure gradient of the particular stressor in the agricultural field based on the first pressure and the model.

9.3 Annual Model

The computer system can leverage data corresponding to a particular agricultural field or crop to develop an annual model for modeling pressures of stressors in the particular agricultural field. For example, during a first season and for a particular crop, the computer system can extract insights into: water movement across the particular crop; sun exposure across the crop (e.g., daily, weekly, monthly, seasonally); and timing of pressures of other stressors such as insects, fungi, and nutrient deficiencies. The computer system can input each of these insights into an annual model for predicting conditions of the crop at the beginning of next season and throughout the next season. Then, at the start of the next season, the computer system can predict initial conditions of the crop based on the model. Further, the computer system can suggest farming practices to a user associated with the crop based on these predicted initial conditions, such as types of seed hybrid to plant and/or different blends of soil to lay. As the season continues, the system can update the annual model accordingly.

Further, based on the annual model, the computer system can predict and/or suggest agricultural products and/or treatments best suited for this agricultural field. For example, the computer system can predict a first pressure of a stressor in plants in the agricultural field at a particular time based on the annual model. Based on the predicted first pressure, the user may apply a new treatment to these plants at the beginning of a season in order to mitigate the predicted first pressure. Later, the computer system can interpret a second pressure in plants in the agricultural field at the particular time based on data recorded by a sensor in the agricultural field. If the second pressure is less than the predicted first pressure, the computer system can update the annual model accordingly and/or recommend the new treatment in the future to treat pressures of the stressor.

10. Single Sentinel Plant

In one variation, the computer system can extract insights from a single sentinel plant (e.g., in a crop of non-sentinel plants, in a greenhouse) to: monitor pressures of stressors in plants in an agricultural field; develop models for predicting plant behavior over time; develop models for predicting plant response to various stressors present at the sentinel plant; develop models for interpreting pressures of stressors at the sentinel plant from measurements; testing efficacy of treatments for various stressors present at the single sentinel plant; and/or develop models for plant response to these treatments.

For example, a single sentinel plant or a single cluster of sentinel plants can be grown in a crop of non-sentinel plants. This single sentinel plant (or single cluster of sentinel plants) can be monitored for presence of stressors at the sentinel plant. For example, the computer system can access data (e.g., images) recorded by a sensor (e.g., a smartphone) and interpret a first pressure of a particular stressor at the sentinel plant based on features extracted from this data. Based on the interpreted first pressure at the single sentinel plant, the computer system can extract insights into plants proximal the single sentinel plant and/or within the crop of non-sentinel plants. Further, the computer system can suggest a particular treatment for plants in the crop based on the interpreted first pressure. Upon application of the particular treatment by a user, the computer system can interpret a second pressure to confirm efficacy of the particular treatment.

In another example, a sentinel plant may be grown in a greenhouse. The computer system can access data (e.g., hyperspectral images) recorded by an optical sensor in the greenhouse to extract a first set of measurements (e.g., intensities of wavelengths) indicative of plant health. A user (e.g., associated with the greenhouse) may collect a sample from the sentinel plant to confirm health of the sentinel plant and/or presence of any stressors at the sentinel plant. In this example, if the user interprets the sentinel plant as healthy and interprets no pressures of a particular stressor present at the sentinel plant based on the collected sample, the computer system can link the first set of measurements to a healthy plant exhibiting no pressures of the particular stressor and store this information into a model. Later, the user may subject the sentinel plant to a pressure of the particular stressor (e.g., drought). The computer system can again access data recorded by the optical sensor in the greenhouse to extract a second set of measurements (e.g., intensities of wavelengths) corresponding to the sentinel plant. The computer system can then link the second set of measurements of the sentinel plant to the pressure of the particular stressor introduced by the user at the sentinel plant and store this information into the model. Thus, over time, the computer system can develop the model linking measurements extracted from data recorded by the optical sensor in the greenhouse to pressures of the particular stressor at the sentinel plant.

In yet another example, the computer system can extract insights related to plant treatment efficacy over time. For example, a sentinel plant can be grown in a greenhouse of plants arranged in vertical stacks (e.g., via vertical farming). The computer system can extract measurements from data (e.g., images) recorded by a sensor in the greenhouse to extract insights into plant health. The computer system can interpret a first pressure of a particular stressor at the sentinel plant based on a first set of measurements extracted from data recorded by the sensor at a first time. The computer system can then notify a user associated with the greenhouse of the first pressure. The user may then apply a particular treatment to plants proximal the sentinel plant in the greenhouse to mitigate the first pressure. Later, the computer system can interpret a second pressure of the particular stressor at the sentinel plant based on a second set of measurements extracted from data recorded by the sensor at a second time (e.g., 24 hours after application of the particular treatment). Based on the first and second pressure, the computer system can derive a model representing pressures of the particular stressor over time in response to application of the particular treatment. The computer system can therefore derive models for predicting plant responses to various treatments and/or agricultural techniques.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other computer systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    accessing a first feed of images recorded at a first frequency by a fixed sensor facing a first set of sentinel plants in an agricultural field;
    accessing a second image of a second set of sentinel plants in the agricultural field, the second image recorded by a mobile sensor during a first time period;
    interpreting a first pressure of a stressor in the first set of sentinel plants during the first time period based on a first set of features extracted from a first image, in the first feed of images, captured during the first time period;
    interpreting a second pressure of the stressor in the second set of sentinel plants during the first time period based on a second set of features extracted from the second image;
    deriving a pressure model associating pressure of the stressor at the first set of sentinel plants and pressure of the stressor at the second set of sentinel plants based on the first pressure and the second pressure;
    interpreting a third pressure of the stressor in the first set of sentinel plants during a second time period based on a third set of features extracted from a third image, in the first feed of images, captured during the second time period;
    predicting a fourth pressure of the stressor in the second set of sentinel plants during the second time period based on the third pressure and the model; and
    in response to the fourth pressure in the second set of sentinel plants exceeding a threshold pressure, generating a prompt to address the stressor in plants proximal the second set of sentinel plants in the agricultural field.

2. The method of claim 1, further comprising:
    accessing a fourth image of the agricultural field recorded by an aerial sensor during the first time period;
    interpreting a first pressure gradient in the agricultural field during the first time period based on a fourth set of features extracted from regions of the fourth image comprising the first set of sentinel plants, the second set of sentinel plants, and a third set of sentinel plants in the agricultural field; and
    rectifying the first pressure gradient in the agricultural field during the first time period based on the first pressure and the second pressure.

3. The method of claim 1, further comprising:
    accessing a fourth image of a third set of sentinel plants in the agricultural field, the fourth image recorded by the mobile sensor during the first time period;
    interpreting a fourth pressure of the stressor in the third set of sentinel plants during the first time period based on a fourth set of features extracted from the fourth image;
    interpreting a first pressure gradient in the agricultural field during the first time period based on the first pressure, the second pressure, and the fourth pressure;
    deriving a gradient model associating pressure of the stressor at the first set of sentinel plants, pressure of the stressor at the second set of sentinel plants, and pressure of the stressor at the third set of sentinel plants based on the first pressure, the second pressure, and the third pressure; and
    interpreting a second pressure gradient in the agricultural field during the second time period based on the third pressure in the first set of sentinel plants and the gradient model.

4. The method of claim 1, wherein generating the prompt to address the stressor in plants proximal the second set of sentinel plants in the agricultural field further comprises:
    isolating a first action, in a set of actions defined for sentinel plants, linked to the stressor; and
    transmitting a notification to perform the first action in the agricultural field to mitigate the stressor to a computing device of a user associated with the agricultural field.

5. The method of claim 1:
    wherein accessing the first feed of images recorded by the fixed sensor comprises accessing the first feed of images recorded by a camera mounted to a fixed beam positioned at a center of the first set of sentinel plants within the agricultural field; and
    wherein accessing the second feed of images recorded by the mobile sensor comprises accessing the second feed of images recorded by a camera of a mobile device of a user associated with the agricultural field.

6. The method of claim 1:
    wherein accessing the first feed of images of the first set of sentinel plants in the agricultural field comprises accessing the first feed of images of the first set of sentinel plants comprising a first cluster of sentinel plants arranged proximal a center of the agricultural field; and
    wherein accessing the second image of the second set of sentinel plants in the agricultural field comprises accessing the second image of the second set of sentinel plants comprising a second cluster of sentinel plants arranged in a row along an edge of the agricultural field.

7. The method of claim 1, wherein accessing the first feed of images of the first set of sentinel plants comprises accessing the first feed of images recorded by the fixed sensor facing the first set of sentinel plants comprising a set of promoters and a set of reporters forming a set of promoter-reporter pairs configured to signal pressures of a set of stressors at sentinel plants, the set of promoter-reporter pairs comprising a first promoter-reporter pair configured to signal pressures of the stressor at the first set of sentinel plants.

8. The method of claim 1:
    wherein accessing the first feed of images recorded by the fixed sensor facing the first set of sentinel plants in the agricultural field comprises accessing the first feed of images recorded by the fixed sensor facing the first set of sentinel plants in a greenhouse environment; and
    wherein accessing the second image of the second set of sentinel plants in the agricultural field recorded by the mobile sensor comprises accessing the second image of the second set of sentinel plants, the second set of sentinel plants arranged in vertically stacked layers within the greenhouse environment.

9. A method comprising:
    accessing a first feed of images recorded at a first frequency by a fixed sensor facing a first set of sentinel plants in an agricultural field;

accessing a second image of a region of the agricultural field comprising the first set of sentinel plants, the second image recorded by a mobile sensor during a first time period;

interpreting a first pressure of a stressor in the first set of sentinel plants during the first time period based on a first set of features extracted from a first image, in the first feed of images, captured during the first time period;

interpreting a first pressure gradient of the stressor in sentinel plants in the region of the agricultural field during the first time period based on a second set of features extracted from the second image;

deriving a gradient model associating pressure of the stressor at the first set of sentinel plants and pressure gradient of the stressor in the region of the agricultural field based on the first pressure of the stressor and the first pressure gradient;

interpreting a second pressure of the stressor in the first set of sentinel plants during a second time period based on a third set of features extracted from a third image, in the first feed of images, captured during the second time period;

predicting a second pressure gradient of the stressor in the region of the agricultural field during the second time period based on the second pressure and the model; and in response to the second pressure gradient predicting a third pressure in a subregion of the agricultural field and exceeding a threshold pressure, generating a prompt to address the stressor in plants occupying the agricultural field proximal the subregion of the agricultural field.

10. The method of claim 9:

wherein accessing the second image of the region of the agricultural field comprising the first set of sentinel plants comprises accessing the second image of the region of the agricultural field comprising the first set of sentinel plants and a second set of sentinel plants;

further comprising:
accessing a second feed of images recorded at the first frequency by a second fixed sensor facing a second set of sentinel plants in the agricultural field; and
interpreting a third pressure of a stressor in the second set of sentinel plants during the first time period based on a fourth set of features extracted from a fourth image, in the second feed of images, captured during the first time period; and wherein deriving the gradient model associating pressure of the stressor at the first set of sentinel plants and pressure gradient of the stressor in the region of the agricultural field based on the first pressure of the stressor and the first pressure gradient comprises deriving the gradient model associating pressure of the stressor at the first set of sentinel plants, pressure of the stressor at the second set of sentinel plants, and the first pressure gradient.

11. The method of claim 9:

wherein accessing the first feed of images recorded by the fixed sensor facing the first set of sentinel plants in the agricultural field comprises accessing the first feed of images recorded by the fixed sensor facing the first set of sentinel plants, in a population of sentinel plants;

wherein accessing the second image of the region of the agricultural field comprising the first set of sentinel plants comprises accessing the second image of the population of sentinel plants, the second image comprising a set of pixels, each pixel in the set of pixels corresponding to a set of sentinel plants, in the population of sentinel plants; and wherein interpreting the first pressure gradient of the stressor in sentinel plants in the region of the agricultural field based on the second set of features extracted from the second image comprises:
interpreting a set of pressures in the population of sentinel plants based on sets of features, in the second set of features, each set of features extracted from a pixel, in the set of pixels; and
generating the first pressure gradient of the stressor in the population of sentinel plants based on each pressure in the set of pressures.

12. The method of claim 9:

wherein accessing the first feed of images of the first set of sentinel plants in the agricultural field comprises accessing the feed of images of the first set of sentinel plants in the agricultural field, sentinel plants in the first set of sentinel plants including a first promoter linked to plant dehydration and a first reporter linked to red fluorescence, the first promoter and the first reporter forming a first promoter-reporter pair configured to signal plant dehydration at sentinel plants in the first set of sentinel plants;

wherein interpreting the first pressure of the stressor in the first set of sentinel plants based on the first set of features extracted from the first image comprises interpreting a first pressure of plant dehydration in the first set of sentinel plants based on a first set of red fluorescence measurements extracted from the first image;

wherein interpreting the first pressure gradient of the stressor in sentinel plants in the region of the agricultural field based on the second set of features extracted from the second image comprises interpreting a first pressure gradient of plant dehydration in sentinel plants in the region of the agricultural field based on a second set of red fluorescence measurements extracted from the second image;

wherein interpreting the second pressure of the stressor in the first set of sentinel plants based on the third set of features extracted from the third image comprises interpreting a second pressure of plant dehydration in the first set of sentinel plants based on a third set of red fluorescence measurements extracted from the third image;

wherein predicting the second pressure gradient of the stressor in the region of the agricultural field based on the second pressure and the model comprises predicting a second pressure gradient of plant dehydration in the region of the agricultural field based on the second pressure and the model; and wherein, in response to the second pressure gradient exceeding the threshold pressure gradient, generating the prompt to address the stressor in plants occupying the agricultural field proximal the region of the agricultural field comprises, in response to the second pressure gradient of plant dehydration exceeding a threshold pressure gradient of plant dehydration, generating a prompt to irrigate plants occupying the agricultural field proximal the region of the agricultural field to an extent corresponding to the second pressure gradient.

13. The method of claim 9:

wherein accessing the first feed of images comprises accessing a first feed of spectral images captured by a first optical spectrometer;

further comprising accessing a reporter model linking solar-induced fluorescence measurements extracted from spectral images to pressures of stressors for sentinel plants; and wherein interpreting the first pressure in the first set of sentinel plants comprises interpreting the first pressure of the stressor based on a first solar-induced fluorescence measurement extracted from the first image.

14. The method of claim 9, wherein interpreting the first pressure of the first stressor in the first set of sentinel plants based on the first set of features extracted from the first image comprises:

extracting a first feature, in the first set of features, from the first image, the first feature corresponding to a first pixel of the first image;

extracting a second feature, in the set of features, from the first image, the second feature corresponding to a second pixel of the first image;

estimating a representative feature based on a combination of the first feature and the second feature;

accessing a reporter model linking features extracted from images in the first feed to pressures of the first stressor at the first set of sentinel plants; and interpreting the first pressure of the first stressor in the first set of sentinel plants based on the representative feature and the reporter model.

15. The method of claim 14:

wherein extracting the first feature from the first image comprises extracting a first intensity of a first wavelength from a first spectral image of the first set of sentinel plants;

wherein extracting the second feature from the first image comprises extracting a second intensity of the first wavelength from the first spectral image;

wherein estimating the representative feature comprises estimating a first average intensity of the first intensity and the second intensity at the first wavelength;

wherein accessing the reporter model linking features extracted from images in the first feed to pressures of the first stressor at the first set of sentinel plants comprises accessing the reporter model linking average intensities at the first wavelength extracted from spectral images of the first feed to pressures of the first stressor at the first set of sentinel plants; and wherein interpreting the first pressure of the first stressor in the first set of sentinel plants based on the representative feature and the reporter model comprises interpreting the first pressure of the first stressor in the first set of sentinel plants based on the first average intensity and the reporter model.

16. A method comprising:

accessing a first feed of images of a first set of sentinel plants in an agricultural field, the first feed recorded at a first frequency by a fixed sensor;

accessing a second image of the agricultural field recorded by an aerial sensor during a first time period;

interpreting a first pressure of a first stressor, in a set of stressors, in the first set of sentinel plants during the first time period based on a first set of features extracted from a first image, in the first feed of images, captured during the first time period;

interpreting a second pressure of the first stressor in the first set of sentinel plants during the first time period based on a second set of features extracted from a region of the second image comprising the first set of sentinel plants;

interpreting a first pressure gradient of the first stressor in the agricultural field during the first time period based on a third set of features extracted from regions of the second image;

deriving a model associating pressure of the first stressor at the first set of sentinel plants with pressure gradient of the first stressor in the agricultural field based on the second pressure and the first pressure gradient; and rectifying the first pressure gradient of the first stressor in the agricultural field during the first time period based on the first pressure and the model.

17. The method of claim 16, further comprising:

interpreting a third pressure of the first stressor in the first set of sentinel plants during a second time period succeeding the first time period based on a fourth set of features extracted from a third image, in the first feed of images, captured during the second time period;

predicting a second pressure gradient of the first stressor in the agricultural field during the second time period based on the third pressure and the model; and in response to the second pressure gradient exceeding a threshold pressure gradient, generating a prompt to address the stressor in plants in the agricultural field.

18. The method of claim 16:

wherein accessing the first feed of images recorded by the fixed sensor comprises accessing the first feed of images recorded by a camera mounted to a fixed beam located within the agricultural field; and wherein accessing the second image of the agricultural field recorded by the aerial sensor comprises accessing the second image of the agricultural field recorded by a satellite.

19. The method of claim 16, further comprising:

accessing a second feed of images of a second set of sentinel plants in the agricultural field, the second feed recorded at a second frequency less than the first frequency;

interpreting a third pressure of a second stressor, in the set of stressors, in the second set of sentinel plants during the first time period based on a fourth set of features extracted from a third image, in the second feed of images, captured during the first time period;

interpreting a fourth pressure of the second stressor in the second set of sentinel plants during the first time period based on a fifth set of features extracted from regions of the fifth image;

interpreting a second pressure gradient of the second pressure in the agricultural field during the first time period based on a sixth set of features extracted from regions of the second image;

deriving a model associating pressure of the second stressor at the second set of sentinel plants with pressure gradient of the second stressor in the agricultural field based on the fourth pressure and the second pressure gradient;

rectifying the second pressure gradient of the second stressor in the agricultural field during the first time period based on the third pressure and the model; and generating a pressure map based on a combination of the first pressure gradient of the first stressor and the second pressure gradient of the second stressor.

20. The method of claim 19:

wherein accessing the first feed of images of the first set of sentinel plants comprises accessing the first feed of images of a first cluster of sentinel plants arranged in the agricultural field, sentinel plants in the first cluster of sentinel plants configured to signal presence of a fungi stressor via pigmentation changes;

wherein accessing the second feed of images of the second set of sentinel plants comprises accessing the second feed of images of a second cluster of sentinel plants arranged in a row along an edge of the agricultural field, sentinel plants in the second cluster of sentinel plants configured to signal presence of an insect stressor via luminescence;

wherein interpreting the first pressure of the first stressor in the first set of sentinel plants comprises interpreting the first pressure of the fungi stressor in the first cluster of sentinel plants based on pigmentation changes of sentinel plants detected in the first image; and wherein interpreting the third pressure of the second stressor in the second set of sentinel plants comprises interpreting the third pressure of the insect stressor in the second set of sentinel plants based on luminescence of sentinel plants in the second cluster of sentinel plants detected in the third image.

* * * * *